United States Patent
Yokono et al.

(10) Patent No.: US 6,865,446 B2
(45) Date of Patent: Mar. 8, 2005

(54) ROBOT DEVICE AND METHOD OF CONTROLLING ROBOT DEVICE OPERATION

(75) Inventors: Jun Yokono, Tokyo (JP); Masahiro Fujita, Saitama (JP); Vincent Hugel, Ban Saint Martin (FR)

(73) Assignee: Sony Corporation, Tokyo (JP)

(*) Notice: Subject to any disclaimer, the term of this patent is extended or adjusted under 35 U.S.C. 154(b) by 70 days.

(21) Appl. No.: 10/258,152
(22) PCT Filed: Feb. 21, 2002
(86) PCT No.: PCT/IB02/00544
§ 371 (c)(1), (2), (4) Date: Jun. 10, 2003
(87) PCT Pub. No.: WO02/065825
PCT Pub. Date: Aug. 29, 2002

(65) Prior Publication Data
US 2004/0034449 A1 Feb. 19, 2004

(30) Foreign Application Priority Data
Feb. 21, 2001 (JP) .......................... 2001-4593

(51) Int. Cl.[7] .............................................. G05B 19/00
(52) U.S. Cl. ................ 700/245; 700/560; 700/246; 700/253; 700/257; 700/258; 700/259; 318/490; 318/565; 318/568.12; 318/15; 901/22; 901/29; 901/46; 901/48; 600/102
(58) Field of Search ............................. 700/245, 260, 700/246, 253, 257–259; 318/490, 565, 568.12, 15; 600/102; 901/22, 29, 46, 48

(56) References Cited

U.S. PATENT DOCUMENTS

| | | | |
|---|---|---|---|
| 4,620,436 A | * 11/1986 | Hirabayashi et al. ......... 73/1.15 |
| 5,390,288 A | * 2/1995 | Toda et al. .................. 700/258 |
| 5,432,417 A | * 7/1995 | Takenaka et al. ...... 318/568.12 |
| 5,513,106 A | * 4/1996 | Yoshino et al. ................ 701/23 |
| 6,459,926 B1 | * 10/2002 | Nowlin et al. ............... 600/429 |
| 6,659,939 B2 | * 12/2003 | Moll et al. ................... 600/102 |

FOREIGN PATENT DOCUMENTS

| | | |
|---|---|---|
| EP | 1 070 571 | 1/2001 |
| JP | 4-48590 | 8/1992 |
| JP | 6-92076 | 11/1994 |
| JP | 11-42576 | 2/1999 |
| JP | 2000-296484 | 10/2000 |
| JP | 2001-25984 | 1/2001 |
| WO | WO 00/40377 | 7/2000 |

OTHER PUBLICATIONS

Esay'02, Evaluating and Architecting System dependability, 2002, Internet, pp. 1–70.*

(List continued on next page.)

Primary Examiner—Gary Chin
Assistant Examiner—McDieunel Marc
(74) Attorney, Agent, or Firm—Frommer Lawrence & Haug LLP; William S. Frommer

(57) ABSTRACT

A robot apparatus is provided which includes body portions such as a head block (4), leg blocks (3A to 3D), an actuator (25) to actuate the body portions and a CPU (10) to supply a control signal to the actuator (25). In this apparatus, information about an external force applied to the apparatus, such as the position, magnitude, direction, etc. of the external force, is computed on the basis of changes of the control signal supplied from the CPU (10) to drive the actuator (25) and a signal supplied as a response to the CPU (10) when the actuator (25) is driven. The external force information is supplied to the CPU (10) and used as information for selection of a behavior and emotion of the robot apparatus and the next behavior of the apparatus. Thus, in the robot apparatus, since the external force information is computed on the basis of an output from the CPU (10) and outputs from the actuator (25) and a potentiometer (26), so an external force can be detected by the use of existing devices and no dedicated sensors have to be additionally provided.

6 Claims, 38 Drawing Sheets

OTHER PUBLICATIONS

Mackenzie et al., Behavior-based mobile manipulation for drum sampling, IEEE, vol.: 3, Apr. 22–28, 1996 pp.:2389–2395 vol. 3.*

Backes, Generalized compliant motion with sensor fusion, IEEE, ICAR., Fifth International Conference on , Jun. 19–22, 1991 pp.: 1281–1286 vol. 2.*

* cited by examiner

If ForceKind == ForceToFoot

If BehaviorStatus == Walking

Command(StopWalking);

If BehaviorStatus == Standing

Command(HandsUp);

If ForceKind == ForceToBody

If BehaviorStatus == Standing

If ForceDirection == Backward

Command(SitDown);

If ForceDirection == Forward

Command(LieDown);

FIG.3

| TRANSITION DESTINATION NODE | INPUT EVENT NAME | DATA NAME | DATA RANGE | PROBABILITY OF TRANSITION TO OTHER NODE | | | | | |
|---|---|---|---|---|---|---|---|---|---|
| node 100 | | | | A | B | C | D | ... | n |
| | | | | node 120 | node 120 | node 1000 | | | node 600 |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | 50% | | | |
| 6 | | JOY | 50.100 | | | 100% | | | |
| 7 | | SURPRISE | 50.100 | | | | | | |
| 8 | | SADNESS | 50.100 | | | | | | |

ROBOT DEVICE AND METHOD OF CONTROLLING ROBOT DEVICE OPERATION

TECHNICAL FIELD

The present invention generally relates to a robot apparatus, method of controlling the operation of the robot apparatus, external force detecting apparatus and method, program for controlling the operation of the robot apparatus, and a recording medium having the program recorded therein, and more particularly to a robot apparatus which autonomously decide its behavior, and behaves adaptively to its surrounding environment and an external action, a method of controlling the operation of such a robot apparatus, an operating controlling program, and a recording medium having the program recorded therein.

BACKGROUND ART

Recently, a quadruped robot apparatus which behaves in response to an instruction given by the user of the robot apparatus and adaptively to the surrounding environment and the like has been developed by the Applicant of the present invention, and commercially available. Such a robot apparatus has installed therein a CCD (charge coupled device) camera and microphone. Assessing the environmental condition and determining whether or not an instruction has been given by the user, based on an environment captured by the CCD camera, and a command voice from the user or an ambient sound, picked up by the microphone, the robot apparatus autonomously decides how to behave, and does the behavior, based on the results of assessment and determination.

However, since the robot apparatuses of the above type are normally used in the ordinary dwellings in which there exist many obstacles to the robot apparatus such as doorsills, power cords and the like, some measures have to be worked out to prevent the robot apparatus from easily tumbling while walking in such an environment. To this end, some solutions have been proposed. One of such solutions is a quadruped robot apparatus which controls its own behavior by detecting an obstacle based on image signals from the CCD camera and causing itself to detour around the obstacle based on the result of detection. Another solution is to provide a special force sensor in each of leg blocks of the robot apparatus, and detect, based on an output from the sensor, whether the robot apparatus has collided with any obstacle.

In the robot apparatus using the CCD camera, however, detecting an obstacle based on the image signals from the CCD camera takes a long time and it is not possible to recognize an obstacle, if any, at any high success rate. Also, the sensors provided in the leg blocks add to the number of parts of the robot apparatus whose construction will thus be complicated and production cost and weight will be increased.

Further, in case such a robot apparatus is provided with a plurality of sensors in predetermined positions, it will be able to detect an obstacle and behave as specified (sitting down, for example) correspondingly to a pressed one of the sensors. Therefore, provision of more sensors on the robot apparatus will permit the user of the robot apparatus to enjoy higher-level interactions with his or her robot apparatus.

However, in case such touch sensors are provided in predetermined positions on the robot apparatus, touch can only be detected in the limited positions and thus the interaction of the robot apparatus with its user will be limited. For example, use of advanced sensors for detection of a direction in which a force has been applied to the robot apparatus will also lead to a complicated construction, and an increased production cost and weight, of the robot apparatus. Also, such sensors cannot be provided at all portions of the robot apparatus.

DISCLOSURE OF THE INVENTION

Accordingly, the present invention has an object to overcome the above-mentioned drawbacks of the conventional robot apparatuses by providing a simply constructed external force detecting apparatus which can detect a collision with an obstacle and also information about the external force such as a direction of the external force, etc., a robot apparatus using the external force detecting apparatus, a method of controlling the operation of the robot apparatus, a program for controlling the operation of the robot apparatus, and a recording medium having the program recorded therein.

The above object can be attained by providing a robot apparatus including according to the present invention:

an actuator whose motion is controlled with a control signal;

a controlling means for outputting the control signal which causes the actuator do a predetermined motion; and means for detecting an external force on the basis of a change shown by the control signal when the external force is applied to the actuator.

Also, the above object can be attained by providing a method of controlling the operation of a robot apparatus, the method including, according to the present invention, steps of:

controlling the motion of an actuator of the robot apparatus with a control signal; and detecting an external force to the robot apparatus on the basis of a change shown by the control signal when the external force is applied to the robot apparatus.

Also, the above object can be attained by providing an external force detecting apparatus including according to the present invention:

means for actuating each portion of a robot apparatus;

a controlling means for specifying, to the actuating means, an amount of motion the actuating means has to do for actuating the portion;

means for detecting an actual amount of motion the actuating means has done; and means for determining, on the basis of the specified and actual amounts of motion, whether or not an external force has been applied to the robot apparatus.

Also, the above object can be attained by providing an external force detecting method including, according to the present invention, steps of:

specifying, to means for actuating each portion of a robot apparatus, an amount of motion the actuating means has to do for actuating the portion;

detecting an actual amount of motion the actuating means has done for actuating the portion; and determining whether or not an external force has been applied to the robot apparatus, on the basis of the specified and actual amounts of motion.

Also, the above object can be attained by providing a program for controlling the operation of a robot apparatus, the program causing the robot apparatus to:

control the motion of an actuator thereof with a control signal; and detect an external force to the robot apparatus on the basis of a change shown by the control signal when the external force is applied to the robot apparatus.

Also, the above object can be attained by providing a recording medium having recorded therein a program which causes a robot apparatus to:

control the motion of an actuator thereof with a control signal; and detect an external force to the robot apparatus on the basis of a change shown by the control signal when the external force is applied to the robot apparatus.

BRIEF DESCRIPTION OF THE DRAWINGS

FIG. 3 shows a program prepared for execution of step S3 in FIG. 2.

FIG. 12 is a conceptual diagram of the state transition table.

BEST MODE FOR CARRYING OUT THE INVENTION

The robot apparatus going to be described below as an embodiment of the present invention is of an autonomous type which autonomously behaves adaptively to its surrounding environment (external factor) and internal state (internal factor). The external factors include a force applied by the user thereto, an external force caused by a touch with an obstacle, etc. The robot apparatus is designed to detect an external force applied thereto.

Figure 1:
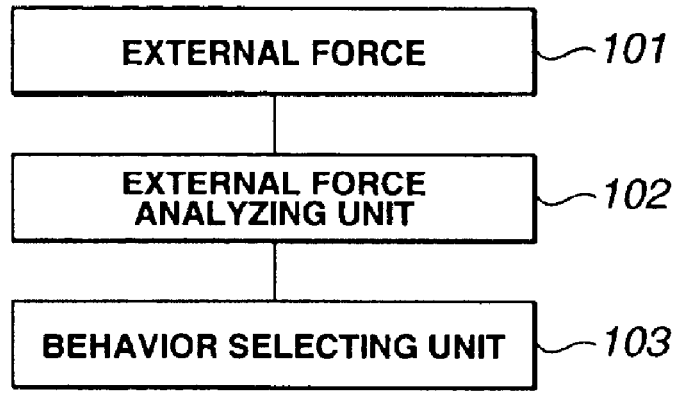
FIG. 1 is a functional block diagram of the basic system of the present invention.
Figure 2:
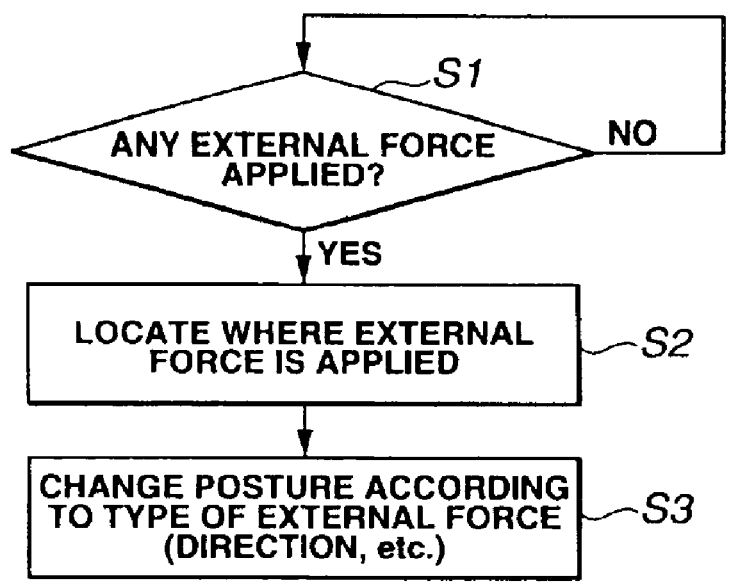
FIG. 2 shows a flow of operations made in the basic system in FIG. 1.

In addition to the basic system for the autonomous behavior to be made based on external and internal factors, the robot apparatus includes an external force sensor 101, external force analyzer 102 and a behavior selector 103 as shown in FIGS. 1 and 2. In step S1, the external force sensor 101 measures the position, direction and magnitude of an external force applied to the robot apparatus. Then, in step S2, the external force analyzer 102 sorts the measured external force according to signals supplied from the external force sensor 101. Further in step S3, the behavior selector 103 causes the robot apparatus to change its posture accordingly to the result of the external force analysis made by the external force analyzer 102.

In step S3, the behavior selection is done according to a program shown in FIG. 3 for example. The program shown in FIG. 3 is prepared so that the next behavior can be selected based on the kind of an external force applied to the robot apparatus and behavior status of the robot apparatus. In the program, the variables "ForceKind", "BehaviorStatus" and "ForceDirection" indicate a position at which the external force is applied, behavior of the robot apparatus and a direction in which the external force is applied, respectively. The behavior selector 103 selects a behavior based on these pieces of information about the external force.

The present invention will be described in detail concerning an external force detecting method adopted in the autonomous robot apparatus designed to select a behavior based on an applied external force.

(1) General Description of the Robot Apparatus

Figure 4:
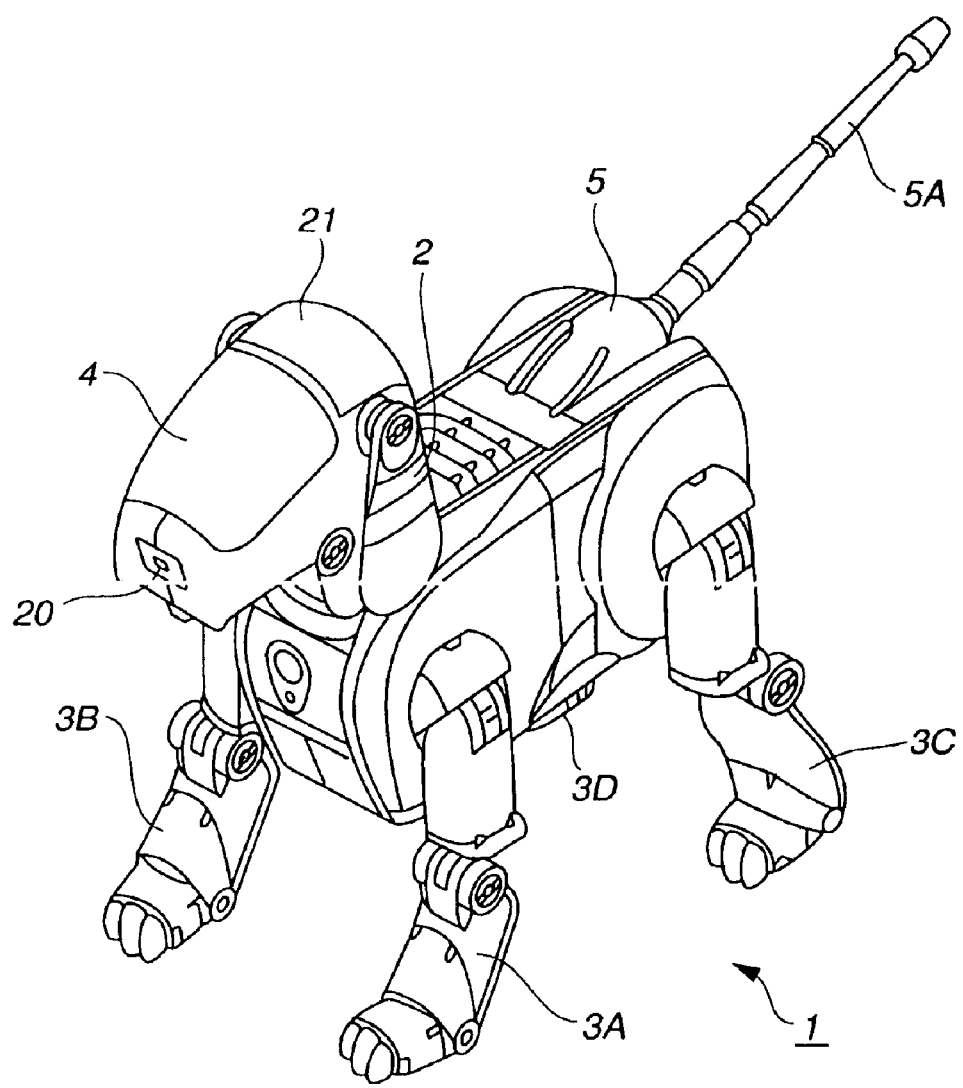
FIG. 4 illustrates, in the form of a perspective view, the appearance of the robot apparatus according to the present invention.

FIG. 4 shows a robot apparatus 1 shaped like an animal such as "dog", namely, a pet robot. As shown, the robot apparatus 1 is composed of a body block 2, leg blocks 3A, 3B, 3C and 3D joined to the front and rear and right and left portions, respectively, of the body block 2, a head block 4 and tail block 5 joined to the front and rear ends, respectively, of the body block 2.

Figure 5:
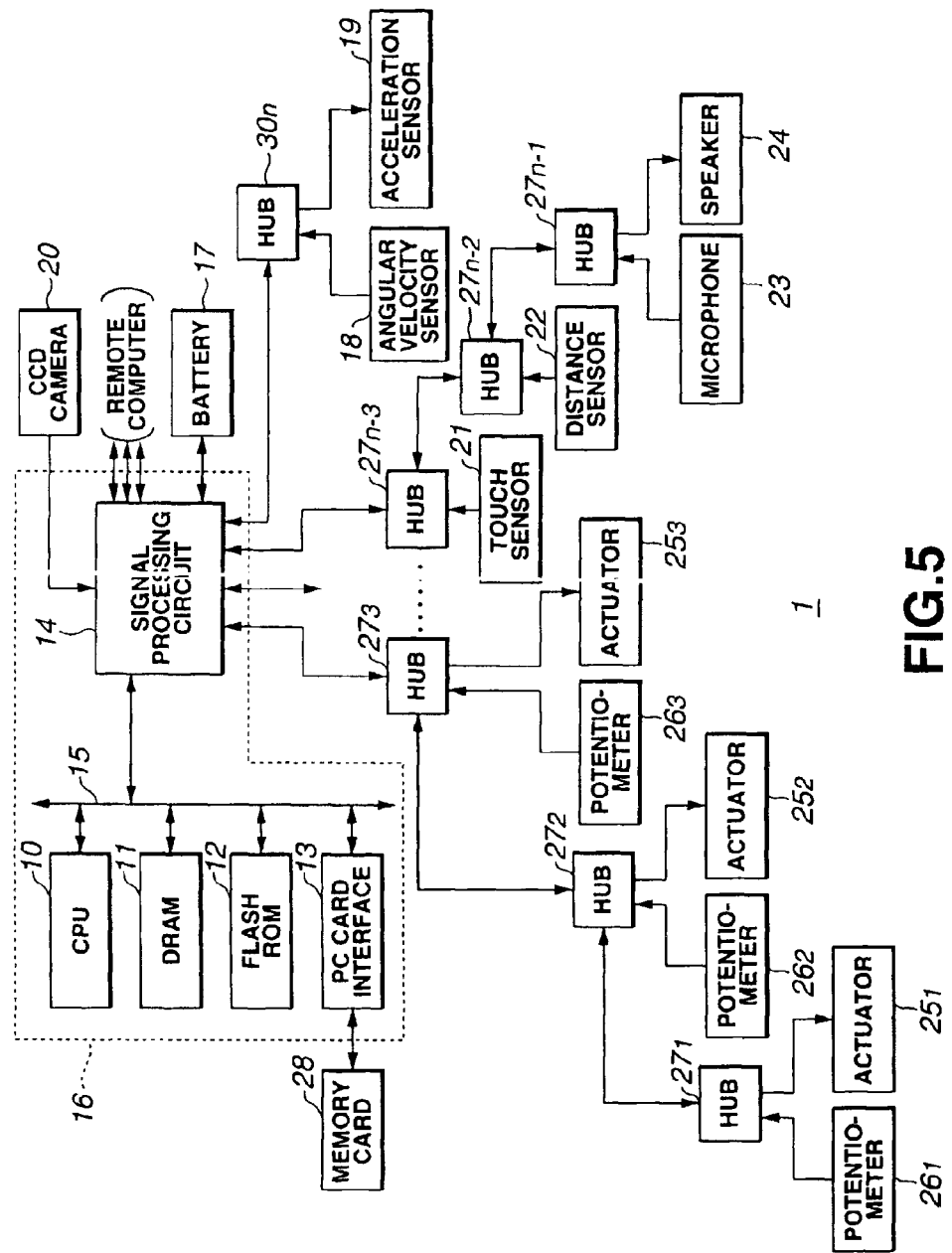
FIG. 5 is a block diagram of the circuit construction of the pet robot shown in FIG. 4.

As shown in FIG. 5, the body block 2 houses a controller 16 including a CPU (central processing unit) 10, DRAM (dynamic random-access memory) 11, flash ROM (read-only memory) 12, PC (personal computer) card interface circuit 13 and a signal processing circuit 14, connected to each other via an internal bus 15, and a battery 17 as a power source for the robot apparatus 1. The body block 2 houses also an angular velocity sensor 18, acceleration sensor 19, etc. which detect the direction and acceleration of a motion of the robot apparatus 1.

The head block 4 has disposed in place therein a CCD (charge-coupled device) camera 20 to capture the outside circumference, a touch sensor 21 to detect a pressure applied to the robot apparatus 1 when the user makes a physical action on to the robot apparatus 1 such as "patting" or "hitting", a distance sensor 22 to measure the distance from the robot apparatus 1 to an object existing before it, a microphone 23 to pick up an external sound, a speaker 24 to output a sound such as yelping, LEDs (light-emitting diode) (not shown) equivalent to the "eyes" of the robot apparatus 1.

Further, the joints of the leg blocks 3A to 3D, links between the leg blocks 3A to 3D and body block 2, link between the head block 4 and body block 2, link between a tail 5A and tail block 5, etc. have disposed therein actuators $25_1$ to $25_n$ and potentiometers $26_1$ to $26_n$ for their respective degrees of freedom. For example, each of the actuators $25_1$ to $25_n$ is a servo motor. The leg blocks 3A to 3D are controlled by their respective servo motors to take a target posture or do a specified motion.

The sensors including the angular velocity sensor 18, acceleration sensor 19, touch sensor 21, distance sensor 22, microphone 23, speaker 24 and potentiometers $26_1$ to $26_n$, and the LEDs and actuators $25_1$ to $25_n$, are connected to the signal processing circuit 14 in the control unit 16 via hubs $27_1$ to $27_n$, respectively. The CCD camera 20 and battery 17 are connected directly to the signal processing circuit 14.

The signal processing circuit 14 sequentially acquires sensor data, image data and sound data from the sensors and sequentially stores the data in place in the DRAM 11 via the internal bus 15. Also, the signal processing circuit 14 acquires residual-potential data from the battery 17, and stores the data in place in the DRAM 11.

The sensor data, image data, sound data and battery residual-potential data stored in the DRAM 11 are subsequently used by the CPU 10 for controlling the operation of the robot apparatus 1.

Actually in the initial operation just after the robot apparatus 1 is turned on, the CPU 10 reads a control program from a memory card 28 set in a PC card slot (not shown) in the body block 2 or the flash ROM 12 via the PC card interface circuit 13 or directly, and stores the program into the DRAM 11.

Thereafter, based on the sensor data, image data, sound data and battery residual-potential data sequentially stored into the DRAM 11 from the signal processing circuit 14 as above, the CPU 10 determines the internal status and surrounding environment of the robot apparatus 1, and whether or not the user has made any instruction and action to the robot apparatus.

The CPU 10 decides the next behavior on the basis of the result of determination and the control program stored in the DRAM 11, and drives corresponding ones of the actuators $25_1$ to $25_n$ on the basis of the determination to turn the head block 4 vertically or horizontally, move the tail 5A of the tail block 5, and actuate the leg blocks 3A to 3D for walking, for example.

Also, the CPU 10 generates sound data when necessary and supplies it as a sound signal to the speaker 24 via the signal processing circuit 14 to output a sound based on the sound signal, or turns on and off or flicker the LEDs.

As above, the robot apparatus 1 can autonomously behave adaptively to its own status and surrounding environment and in response to an instruction and action from the user.

(1-1) Signal Processing Circuit

Figure 6:
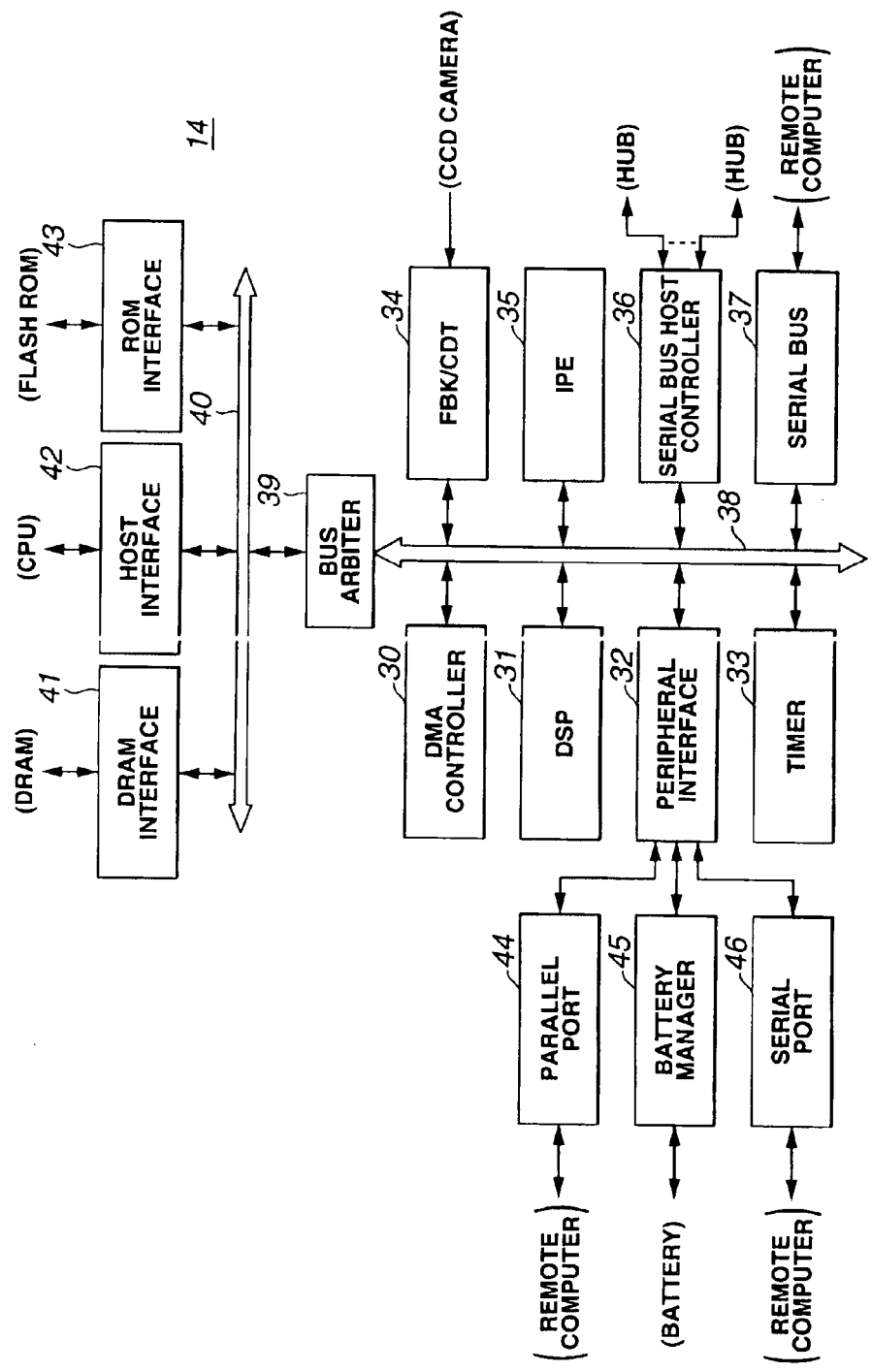
FIG. 6 is a block diagram of the signal processing circuit.

As shown in detail in FIG. 6, the signal processing circuit 14 includes a DMA (direct memory access) controller 30, DSP (digital signal processor) 31, peripheral interface 32, timer 33, FBK/CDT (filter bank/color detector) 34, IPE (inner product engine) 35, serial bus host controller 36 and serial bus 37, connected to a bus 40 via a bus 38 and an arbiter 39 which arbitrates the right of using the bus 38 in this order. The bus 40 is connected to the DRAM 11 (shown in FIG. 5), CPU 10 (in FIG. 5) and flash ROM 12 (in FIG. 5) via a DRAM interface 41, host interface 42 and ROM interface 43, respectively, and a parallel portion 44, battery manager 45 and serial portion 46 are connected to the peripheral interface 32.

The devices including the angular velocity sensor 18, acceleration sensor 19, touch sensor 21, distance sensor 22, microphone 23, speaker 24, actuators 25 ($25_1$, $25_2$, $25_3$, ...), potentiometers 26 ($26_1$, $26_2$, $26_3$, ...), etc. having been described above with reference to FIG. 5 are connected to the serial bus host controller 36 via the hubs 27 ($27_1$ to $27_n$), respectively. The CCD camera 20 (shown in FIG. 2) is connected to the FBK/CDT 34, and the battery 17 (in FIG. 5) is connected to the battery manager 45.

The serial bus host controller 36 is sequentially supplied with sensor data from the angular velocity sensor 18, acceleration sensor 19, touch sensor 21, distance sensor 22, microphone 23, speaker 24, potentiometers 26 ($26_1$, $26_2$, $26_3$, ...), etc. of the devices connected thereto, and stores the data into the DRAM 11 via the bus 38, bus arbiter 39, bus 40 and DRAM interface 41 in this order under the control of the DMA controller 30 which functions as a bus master to control the data transfer.

Also, the serial bus host controller 36 sends sound data from the microphone 23 to the DSP 31 which will process the sound data in a predetermined manner, transfers the sound data thus processed to the DRAM 11 via the bus 38, bus arbiter 39, bus 40 and DRAM interface 41 in this order under the control of the DRAM controller 30, and thus stores the sound data in a predetermined storage area in the DRAM 11.

The FBK/CDT 34 acquires image data from the CCD camera 20 while making color recognition of the data to sort the data according to a plurality of resolutions, transfers the image data to the DRAM 11 (in FIG. 5) via the bus 38, bus arbiter 39, bus 40 and DRAM interface 41 in this order under the control of the DMA controller 30, and thus stores the image data in a specified storage area in the DRAM 11 as will be described later.

Further, the battery manager 45 transfers the battery residual-potential data send from the battery 17 and indicating an energy remaining in the battery 17 to the DRAM 11 via the peripheral interface 32, bus 38, bus arbiter 39, bus 40 and DRAM interface 41 in this order under the control of the DAM controller 30, and thus stores the data in a predetermined storage area of the DRAM 11.

On the other hand, the signal processing circuit 14 is supplied, via the host interface 42, with a first drive signal to drive the actuators 25 ($25_1$, $25_2$, $25_3$, ...), sound signal and a second drive signal to drive the LEDs, given from the CPU 10 (in FIG. 5) via the bus 15 (in FIG. 5) as above.

Then, the signal processing circuit 14 sends the signals to corresponding ones of actuators 25 ($25_1$, $25_2$, $25_3$, ...) (in FIG. 5), speaker 24 (in FIG. 5) or LEDs via the bus 40, bus arbiter 39, bus 38, serial bus host controller 36 and corresponding hubs 27 ($27_1$ to $27_n$) (in FIG. 5) in this order.

As above, the signal processing circuit 14 is provided between the CPU 10 and the devices such as the sensors, CCD camera 20, microphone 23, speaker 24, actuators 25 ($25_1$, $25_2$, $25_3$, ...), etc. and can make various kinds of signal processing necessary for the CPU 10 to control the behavior of the robot apparatus 1.

(1-2) Software Configuration of the Control Program.

Next, the software configuration of the control program adopted in the robot apparatus 1 will be described.

Figure 7:
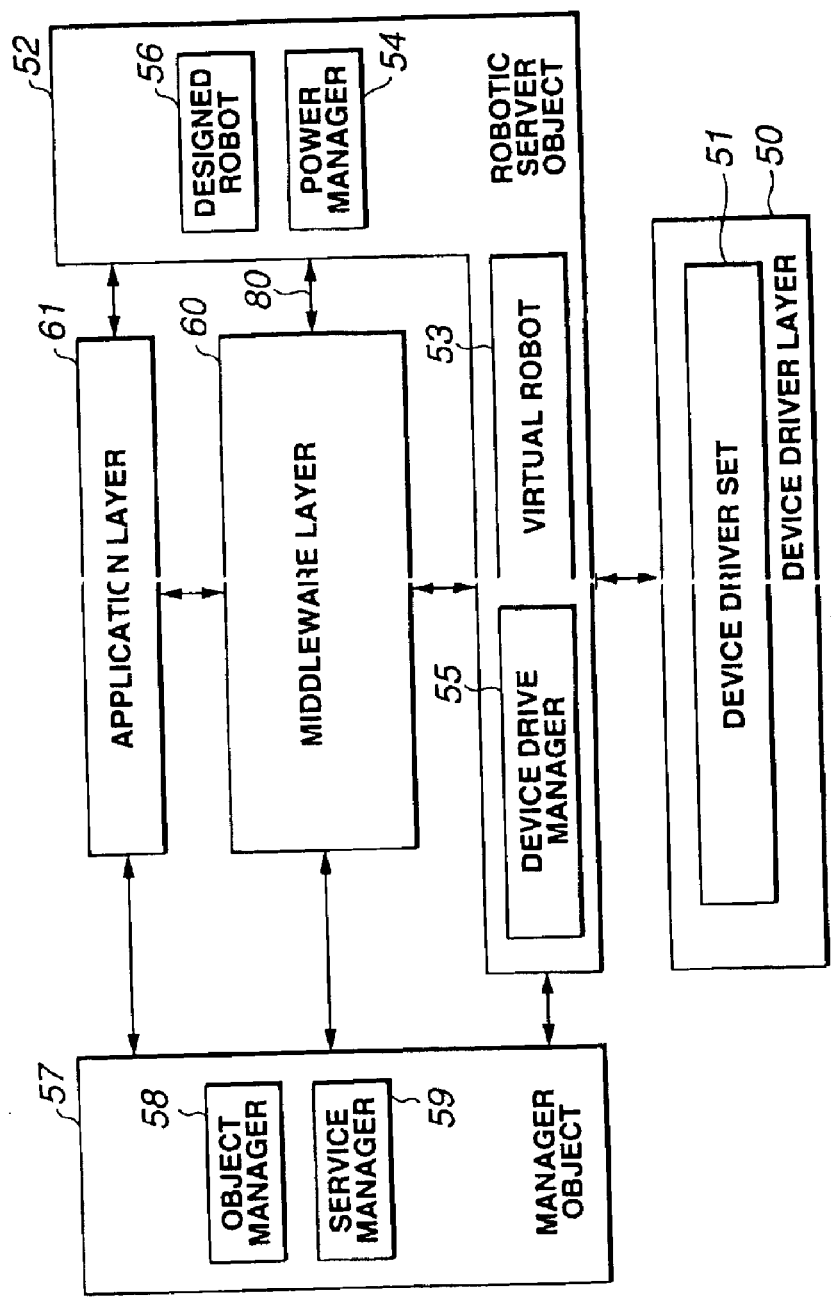
FIG. 7 is a conceptual block diagram of the software configuration of the control program.

FIG. 7 shows the software configuration of the above-mentioned control program used in the robot apparatus 1. As shown, the control program includes a device driver layer 50 laid in the bottom layer thereof and formed from a device driver set 51 composed of a plurality of device drivers. In this program, each of the device drivers 51 is an object allowed to access directly the CCD camera 20 (in FIG. 5) and an ordinary computer hardware such as a timer, and works upon interruption from a corresponding hardware.

The control program includes also a robotic server object 52 laid above the device driver layer 50. The robotic server object 52 is composed of a virtual robot 53 formed from a software group which provides an interface for access to the hardware such as the aforementioned sensors and actuators 25 ($25_1$ to $25_n$), a power manager 54 formed from a software group which manages selection between the batteries, a device driver manager 55 formed from a software group which manages the other various device drivers, and a designed robot 56 formed from a software group which manages the mechanism of the robot apparatus 1.

The control program includes also a manager object 57 composed of an object manager 58 and service manager 59. In this control program, the object manager 58 is a software group which manages start and end of each of software groups included in the robotic server object 52, middleware layer 60 and application layer 61. The service manager 59 is a software group which manages connection between the objects on the basis of inter-object connection information stated in a connection file stored in the memory card 28 (in FIG. 5).

The middleware layer 60 is formed from a software group laid above the robotic server object 52 to provide basic functions of the robot apparatus 1 such as image processing and sound processing. The application layer 61 is formed from a software group laid above the middleware layer 60 to decide a behavior of the robot apparatus 1 on the basis of the result of a processing having been made by each software group included in the middleware layer 60.

Figure 8:
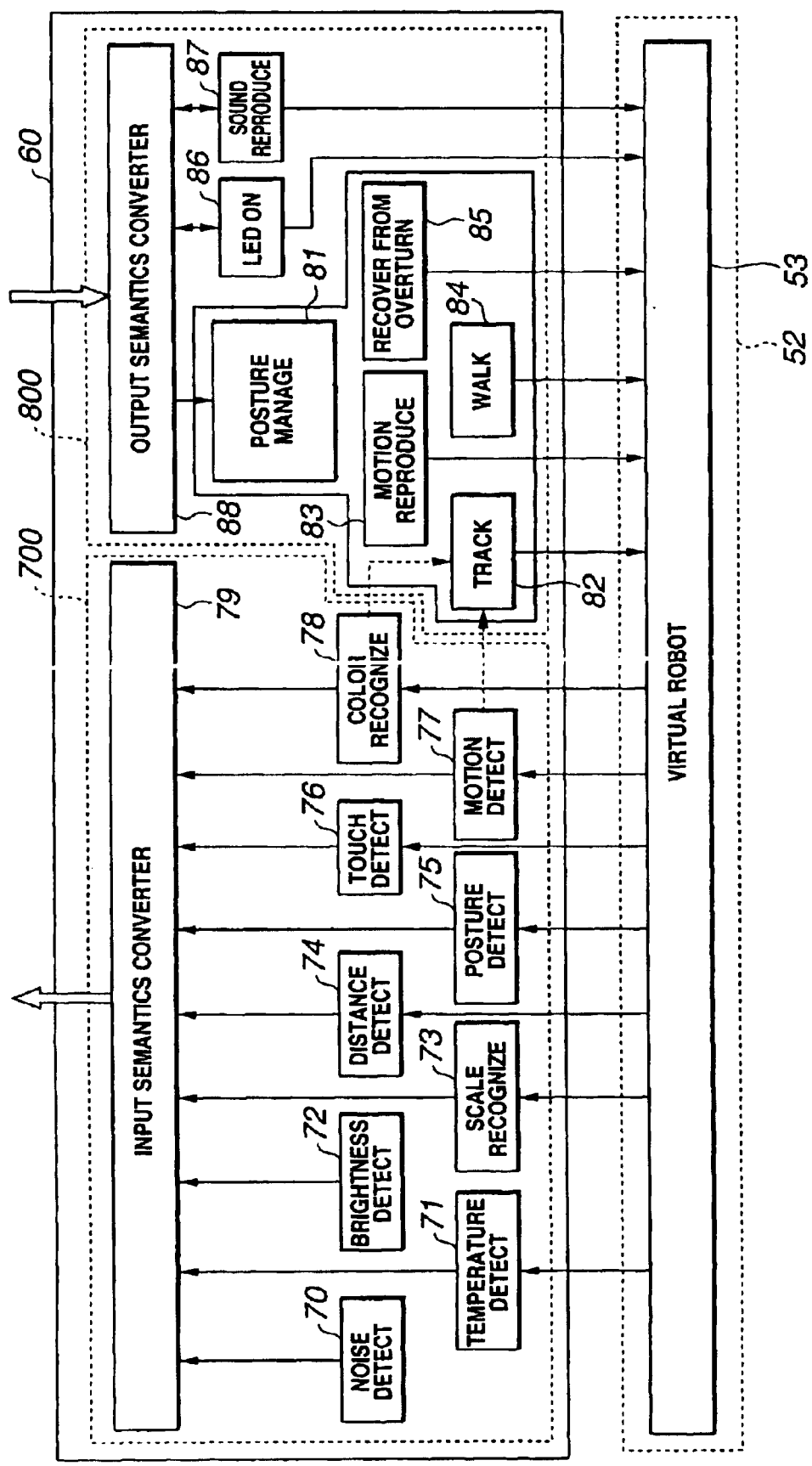
FIG. 8 is a conceptual block diagram of the middleware layer.
Figure 9:
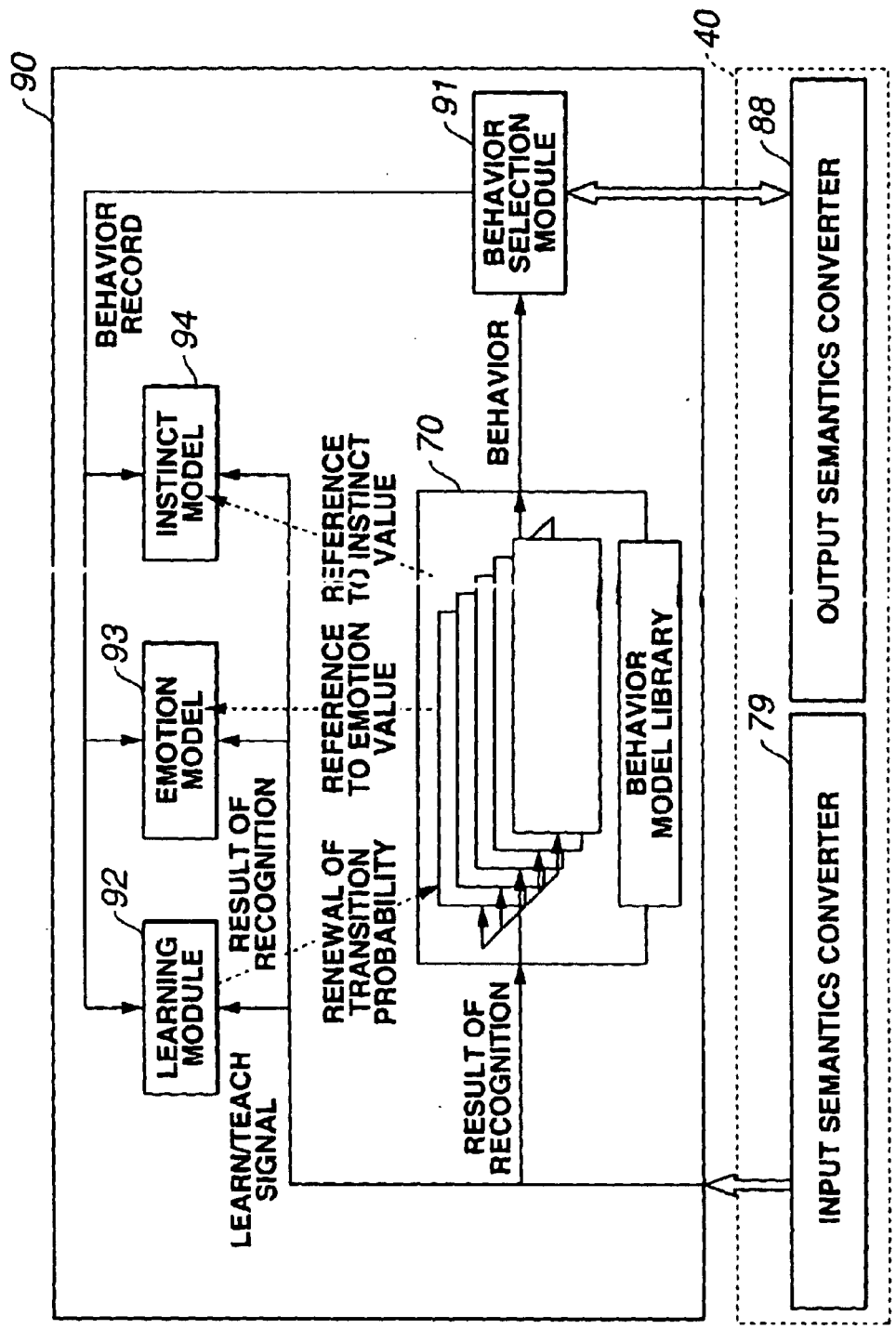
FIG. 9 is a conceptual block diagram of the application layer.

The concrete software configurations of the middleware layer 60 and application layer 61 are shown in FIGS. 8 and 9, respectively. As seen from FIG. 8, the middleware layer 60 is composed of a recognition system 700 including signal processing modules 70 to 78 to detect a noise, temperature, brightness, scale, distance, posture, touch, motion and color, respectively, and an input semantics converter module 79, and an output system 800 including an output semantics converter module 88 and signal processing modules 81 to 87 provided for posture management, tracking, motion reproduction, walking, recovery from overturn, LED turn-on and sound reproduction, respectively.

In this embodiment, the signal processing modules 70 to 78 included in the recognition system 700 acquire corresponding ones of the sensor data, image data and sound data read by the virtual robot 53 in the robotic server object 52 from the DRAM 11 (in FIG. 5), make a predetermined processing on the basis of the data, and supply the result of processing to the input semantics converter module 79.

The input semantics converter module 79 recognizes, on the basis of the result of processing supplied from the signal processing modules 70 to 78, the internal status and surrounding environment of the robot apparatus 1 and an instruction and action from the user, such as "noisy", "hot", "bright", "the robot apparatus detected a ball", "the robot apparatus detected itself tumbled", "the robot apparatus was patted", "the robot apparatus was hit", "the robot apparatus heard scales "do", "mi" and "so", "the robot apparatus detected a moving object" or "the robot apparatus detected an obstacle", and outputs the results of recognition to the application layer 61 (in FIG. 7).

As shown in FIG. 9, the application layer 61 is composed of five modules including a behavior model library 90, behavior selection module 91, learning module 92, emotion model 93 and an instinct model 94.

Figure 10:
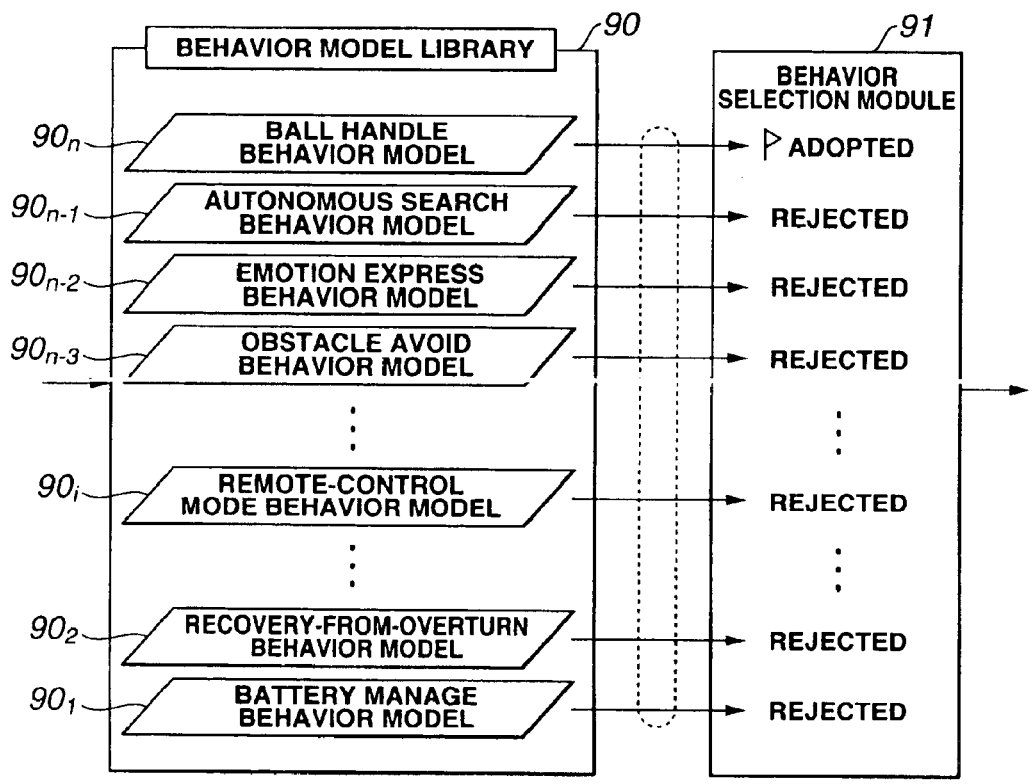
FIG. 10 is a conceptual diagram of the behavior model library.

In this embodiment, the behavior model library 90 includes independent behavior models $90_1$ to $90_n$ corresponding to some pre-selected conditional items such as "the battery residual-potential has become low", "the robot apparatus recovers from overturn", "the robot apparatus expresses an emotion", "the robot apparatus has detected a ball", etc. as shown in FIG. 10.

When supplied with the results of recognition from the input semantics converter module 76 or upon elapse of a predetermined time after the last result of recognition is supplied, the behavior models $90_1$ to $90_n$ decide the next behavior while referring to a corresponding emotion parametric value held in the emotion model 93 and a corresponding desire piece parametric value held in the instinct model 94 as necessary as will be described later, and supply the result of decision to the behavior selection module 91.

Figure 11:
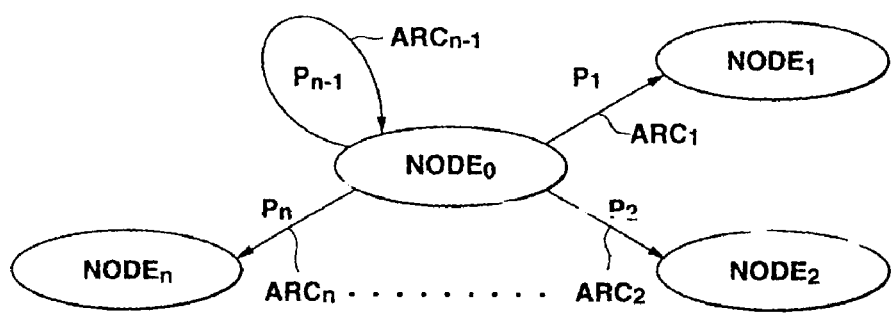
FIG. 11 is a conceptual diagram of the probability automaton.

Note that in this embodiment, each of the behavior models $90_1$ to $90_{n+1}$ uses, for deciding the next behavior, an algorithm called "probability automaton" to stochastically decide, on the basis of transition probabilities $P_1$ to $P_{n+1}$ set for arcs $ARC_1$ to $ARC_{n+1}$ connecting the nodes $NODE_0$ to $NODE_n$ to each other, which one of nodes $NODE_0$ to $NODE_n$ (as shown in FIG. 11) is a transition source and which other one of the nodes $NODE_0$ to $NODE_n$ is a transition destination.

More specifically, each of the behavior models $90_1$ to $90_n$ has a state transition table 100, as shown in FIG. 12, for each of the nodes $NODE_0$ to $NODE_n$ forming the behavior models $90_1$ to $90_n$.

The state transition table 100 has events (results of recognition) being conditions for transition from one to another of the nodes $NODE_0$ to $NODE_n$ listed in lines thereof corresponding to a column "Input event name" thereof in the order of priority, and further such transition conditions listed in lines corresponding to columns "Data name" and "Data range".

Therefore, according to the state transition table 100 in FIG. 12, the robot apparatus 1 can transit in state from the node 100 to any other node only when the size of the ball (SIZE), given together with the result of recognition, is within a range "0 to 1000" in case the result of recognition is "the robot apparatus detected a ball (BALL)", or only when the distance (DISTANCE) from the robot apparatus 1 to the obstacle, given together with the result of recognition, is within a range of "0 to 100" in case the result of recognition is "the robot apparatus detected an obstacle (OBSTACLE)".

Also, according to the state transition table 100, the robot apparatus 1 can transit in state from the node 100 to any other node when any one of "JOY", "SURPRISE" and "SADNESS" among parametric values of emotions and desire pieces, held in the emotion model 93 and instinct model 94 to which the behavior model $90_1$ to $90_n$ cyclically refer, has a value within a range of "50 to 100" even if no result of recognition is supplied.

Also in the state transition table 100, there is written in a line "Transition destination node" corresponding to a column "Probability of transition to other node" the names of nodes to which the robot apparatus 1 can transit in state from any one of the nodes $NODE_0$ to $NODE_n$, there is written in a line corresponding to the column "Probability of transition to other node" a probability of transition with which the robot apparatus 1 can transit in state to other one of the nodes $NODE_0$ to $NODE_n$ when all the conditions written in lines "Input event name", "Data value" and "Data range" are met, and there is written in a line "Output behavior" corresponding to the "Probability of transition to other node" a behavior to be made by the robot apparatus 1 when it transits in state to the above node among the nodes $NODE_0$ to $NODE_n$. It should be noted that the sum of probabilities in the lines corresponding to the column "Probability of transition to other node" is 100 (%).

Therefore, according to the state transition table 100 in FIG. 12, the robot apparatus 1 can transit in state from the node 100 to the node "node 120" with a probability of "30 (%)" when it has been recognized that "the robot apparatus detected a ball (BALL)" and "the size of the ball (SIZE)" is within a range of "0 to 1000", and the output behavior will be "ACTION1".

Each of the behavior models $90_1$ to $90_n$ is composed of a plurality of the nodes $NODE_0$ to $NODE_n$ connected to each other as written in the above state transition table 100. When supplied with a result of recognition from the input semantics converter module 76 or so, the behavior model stochastically decides the next behavior by the use of the state transition table 100 of a corresponding one of the nodes $NODE_0$ to $NODE_n$, and supplies the result of decision to the behavior selection module 91.

The behavior selection module 91 selects, from behaviors outputted from the behavior models $90_1$ to $90_n$, respectively, of the behavior model library 90, ones outputted from the behavior models $90_1$ to $90_n$, having higher predetermined priority, and sends a command for making a behavior (will be referred to as "behavior command" hereunder) to the output semantics converter 88 in the middleware layer 60. It should be noted that in this embodiment, the lowest one of the behavior models $90_1$ to $90_n$ in FIG. 10 is set to have the highest priority and the highest one is set to have the lowest priority.

Also, based on behavior completion information supplied from the output semantics converter 88 after completion of a behavior, the behavior selection module 91 informs the learning module 92, emotion model 93 and instinct model 94 of the completion of the behavior.

On the other hand, the learning module 92 is supplied with a result of recognition of a teaching given as an action from the user, such as "hit" or "patted", among the results of recognition supplied from the input semantics converter 79.

Then the learning module 92 will change the probability of transition of a corresponding one of the behavior models $90_1$ to $90_n$ in the behavior model library 90 on the basis of the result of recognition and information from the behavior selection module 91 to lower the probability of execution of the behavior when the robot apparatus 1 has been "hit (scolded)", while raising the behavior execution probability when the robot apparatus 1 has been "patted (praised)".

On the other hand, the emotion model 93 holds a parametric value indicative of the strength of each of six emotions including "joy", "sadness", "anger", "surprise", "disgust" and "fear". The emotion model 93 cyclically renews the parametric values of these emotions according to special results of recognition such as "hit", "patted" and the like supplied from the input semantics converter module 79, elapsed time and information from the behavior selection module 91.

More particularly, the emotion model 93 computes, by a predetermined algorithm, a variation of the emotion at a time on the basis of a recognition result supplied from the input semantics converter module 79, a behavior of the robot apparatus 1 at that time and an elapsed time from the last renewal. Then, taking the emotion variation as $\Delta E[t]$, current parametric value of the emotion as $E[t]$ and coefficient indicating the sensitivity to the emotion as $k_e$, the emotion model 93 determines a parametric value $E[t+1]$ of the emotion in the next cycle by computing an equation (1), and replaces the previous parametric value $E[t+1]$ with the current parametric value $E[t]$ of the emotion, to thereby renew the parametric value of the emotion. The emotion model 93 similarly computes the equation (1) to renew the parametric values of all the remaining emotions.

$$E[t+1]=E[t]+k_e\times\Delta E[t] \qquad (1)$$

Note that it is predetermined how much each recognition result and the information from the output semantics converter module 88 influence the variation $\Delta E[t]$ of the parametric value of each emotion. The predetermination is such that for example, the result of recognition of "hit" will have an greater influence on the variation $\Delta E[t]$ of the parametric value of the "anger" emotion, while the result of recognition of "patted" will have a greater influence on the variation $\Delta E[t]$ of the parametric value of the "joy" emotion.

The information from the output semantics converter module 88 is feed-back information on behavior (behavior-completion information). Namely, it is information on the result of behavior execution. The emotion model 93 will change the emotion with such information. For example, "whining" behavior will lower the level of "anger" emotion. It should be noted that the information from the output semantics converter module 88 is also supplied to the aforementioned learning module 92 which will change, based on the information, the probabilities of transition corresponding to the behavior models $90_1$ to $90_n$.

Note that the result of behavior may be fed back by an output (behavior having a feeling added thereto) of the behavior selection module 91.

On the other hand, the instinct model 94 holds a parametric value indicative of the intensity of each of four desire (instinct) pieces including "exercise", "affection", "appetite" and "curiosity". The instinct model 94 cyclically renews the parametric values of these desire pieces according to the results of recognition supplied from the input semantics converter module 79, elapsed time, information from the behavior selection module 91, etc.

More particularly, the instinct model 94 computes, by a predetermined algorithm, a variation of each of instinct (desire) pieces including "exercise", "affection", "appetite", and "curiosity" at a time on the basis of a recognition result, elapsed time and information from the output semantics converter module 88. Then, taking the desire piece variation as $\Delta I[k]$, current parametric value of the desire piece as $I[k]$ and coefficient indicating the sensitivity to the desire piece as $k_i$, the instinct model 94 computes a parametric value $I[k+1]$ of the desire piece in the next cycle by computing an equation (2) in a given cycle, and replaces the value $I[k+1]$ with the current parametric value $I[k]$ of the desire piece, to thereby renew the previous parametric value of the desire piece. The instinct model 94 similarly computes the equation (2) to renew the parametric values of all the remaining pieces of instinct (desire) except for the "appetite".

$$I[k+1]=I[k]+k_i\times\Delta I[k] \qquad (2)$$

Note that it is predetermined how much each of the recognition results and the information from the output semantics converter module 88 influence the variation $\Delta I[k]$ of the parametric value of each desire piece. The predetermination is such that for example, the information from the output semantics converter module 88 will have a great influence on the variation $\Delta I[k]$ of the parametric value of "fatigue" state.

Note that in this embodiment, the parametric values of the emotions and desire (instinct) pieces are defined to vary within a range of 0 to 100, and the coefficients $k_e$ and $k_i$ are also set for each of the emotions and desire pieces.

On the other hand, the output semantics converter module 88 of the middleware layer 40 supplies, as shown in FIG. 9, a corresponding one of the signal processing modules 78 to 84 of the output system 800 with an abstract behavior command such as "go ahead", "joy", "whine" or "track (a ball)" having been supplied from the behavior selection module 91 of the application layer 61 as above.

When supplied with the above behavior command, the signal processing modules 81 to 85 generate, on the basis of the behavior command, a servo command for supply to a corresponding one of the actuators $25_1$ to $25_n$ (in FIG. 5), sound data from the speaker 24 (in FIG. 5) and/or drive data for supply to the "eyes" LEDs, and sequentially sends these data to the corresponding one of the actuators $25_1$ to $25_n$, speaker 24 or LEDs via the virtual robot 53 of the robotic server object 52 and signal processing circuit 14 (in FIG. 5) in this order.

As above, the robot apparatus 1 can do, under the control program, an autonomous behavior adaptively to its internal state and surrounding environment, instruction and action from the user.

When supplied with the above behavior command, the signal processing modules 81 to 87 generate, on the basis of the behavior command, a servo command for supply to a corresponding one of the actuators $25_1$ to $25_n$ (in FIG. 5), sound data from the speaker 24 (in FIG. 5) and/or drive data for supply to the "eyes" LEDs, and sequentially sends these data to the corresponding one of the actuators $25_1$ to $25_n$, speaker 24 or LEDs via the virtual robot 53 of the robotic server object 52 and signal processing circuit 14 (in FIG. 12) in this order.

As above, the robot apparatus 1 can do, under the control program, an autonomous behavior adaptively to its internal state and surrounding environment, instruction and action from the user.

(2) First Method of Detecting External Force in the Embodiment

Figure 13:
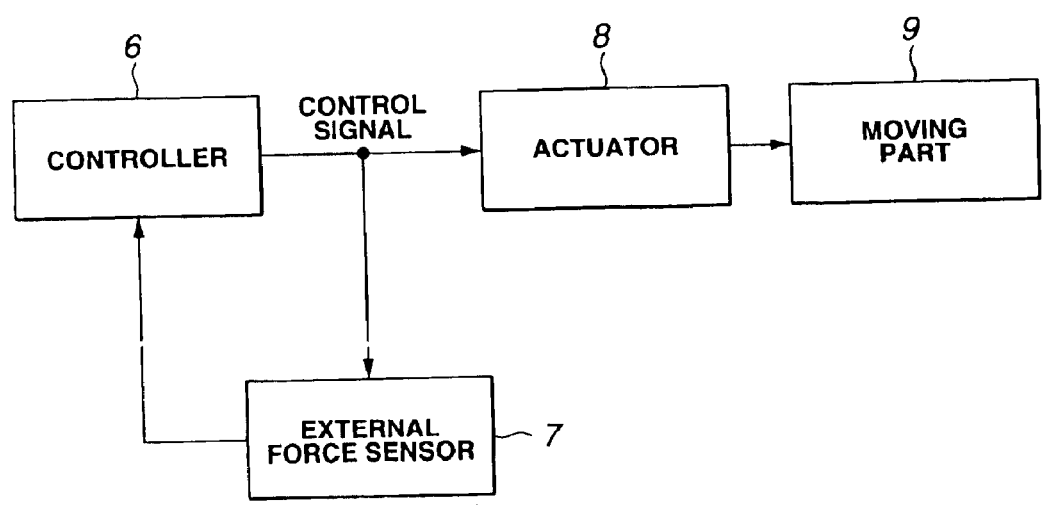
FIG. 13 is a block diagram of the main system of the robot apparatus, intended to detect an external force to the robot apparatus.

The robot apparatus 1 further includes an external force sensor 7 to detect an external force applied to the robot apparatus 1 as shown in FIG. 13. When an external force is applied to the robot apparatus 1, the external force sensor 7 detects the external force on the basis of a change shown by a control signal supplied from a controller 6 to an actuator 8 and destined for controlling moving parts 9 when the external signal is applied to the robot apparatus 1.

The external force sensor 7 is a module or object which is a processing program. Also, the controller 6 includes a CPU 10, for example. The moving parts 9 include the aforementioned leg blocks 3A to 3D, head block 4 or tail block 5, etc. The control signal is a pulse having the width thereof modulated by data, namely, a PWM (pulse width modulation) pulse, for example. The PWM pulse is often used as a control signal.

Because of the aforementioned robot apparatus construction, an external force applied to the robot apparatus 1 can be detected as follows:

The controller 6 supplies a control signal to one of the moving parts 9. The robot apparatus 1 has a plurality of predetermined behavior program data, for example. The behavior program data are information about behaviors which can be executed by the robot apparatus 1. Namely, the robot apparatus 1 can execute various behaviors according to the plurality of behavior program data. The controller 6 selects one of the plurality of thus prepared behavior program data under given conditions, and generates a control signal based on the selected behavior program data. The given conditions include for example that an emotion defining a behavior of the robot apparatus 1 is at a predetermined level.

The control signal from the controller 6 is supplied to the actuator 8. The actuator 8 controls the moving part 9 based on the control signal, and also controls the moving part 9 according to control signals supplied one after another from the controller 6 based on the behavior program data.

The external force sensor 7 monitors the control signal supplied from the controller 6 to the actuator 8 as above to detect an external force on the basis of a change shown by the control signal when the external force is applied to the moving part 9. For example, when the control signal is a PWM pulse, the external force sensor 7 detects an external force on the basis of a change in width shown by the PWM pulse when the external force is applied to the moving part 9. Thus, the external force sensor 7 detects the external force. Also, the external force sensor 7 acquires the direction and magnitude of the external force as information about the external force.

The robot apparatus 1 constructed as above can have the posture and operation thereof controlled according to a control signal, and detect an external force based on the control signal. For example, when the robot apparatus 1 has the body thereof pushed backward with an external force, it generates a control signal to control its posture against the backward movement and can acquire information about the external force on the basis of the control signal.

Then, with external force information and specified operations being linked to each other, for example, the robot apparatus 1 can detect, when applied with an external force, information about the external force, and do a specified behavior ("sit down" for example) corresponding to the external force.

(2-1) Concrete Example of the External Force Detection

Next, the detection of an external force will be described in detail below. In the foregoing, there has been described the computation, using a PWM pulse as a control signal, of information about an external force (direction, magnitude, etc.) applied to the robot apparatus 1. Here will be described a concrete example of the acquisition of information about an external force on the basis of such a PWM pulse. External force information is acquired on the basis of a PWM pulse generally in the following four steps.

In a first step, there is determined a relation between a torque A (measured value) and a PWM pulse.

In a second step, there is determined a relation between a force detected by a sensor or the like (measured value) and a torque B (computed value).

In a third step, there is determined a relation (relational expression) between the torques A and B.

In a fourth step, the relation determined in the third step is used to acquire information about the force solely from the PWM pulse computed for each of the joints.

Each of the above steps will be described in detail.

(2-1-1) Determination of the Relation Between Measured Torque and PWM Pulse (First Step)

Figure 14:
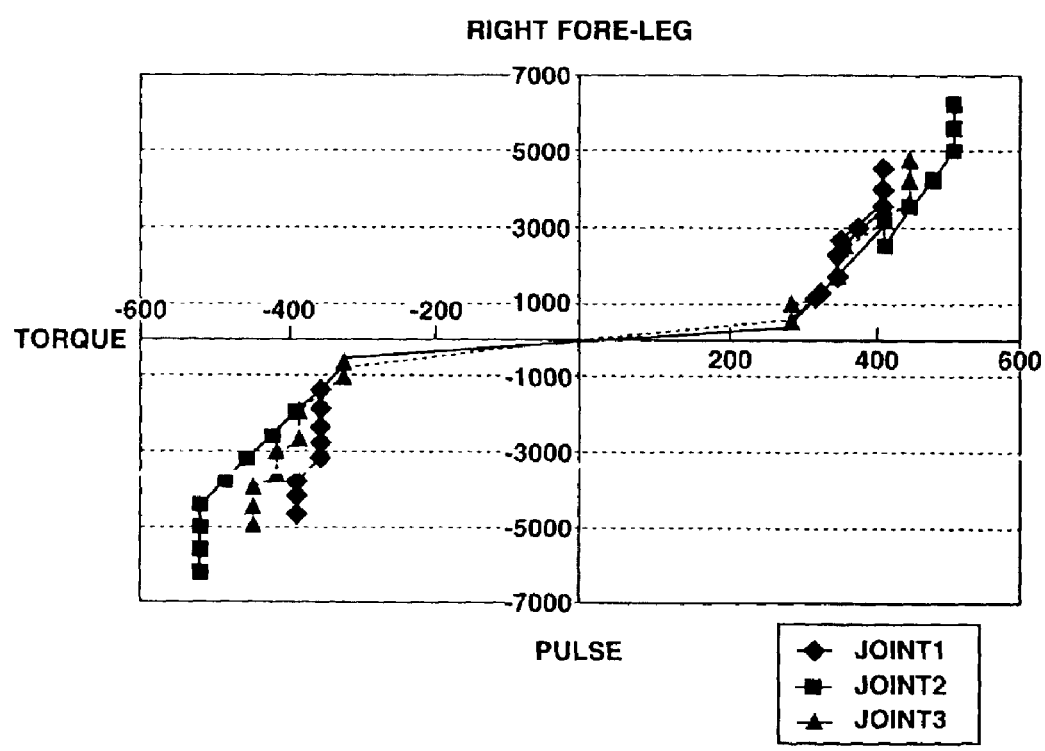
FIG. 14 is a characteristic graph showing the relation between PWM pulse and measured torque at the right fore-leg block.
Figure 15:
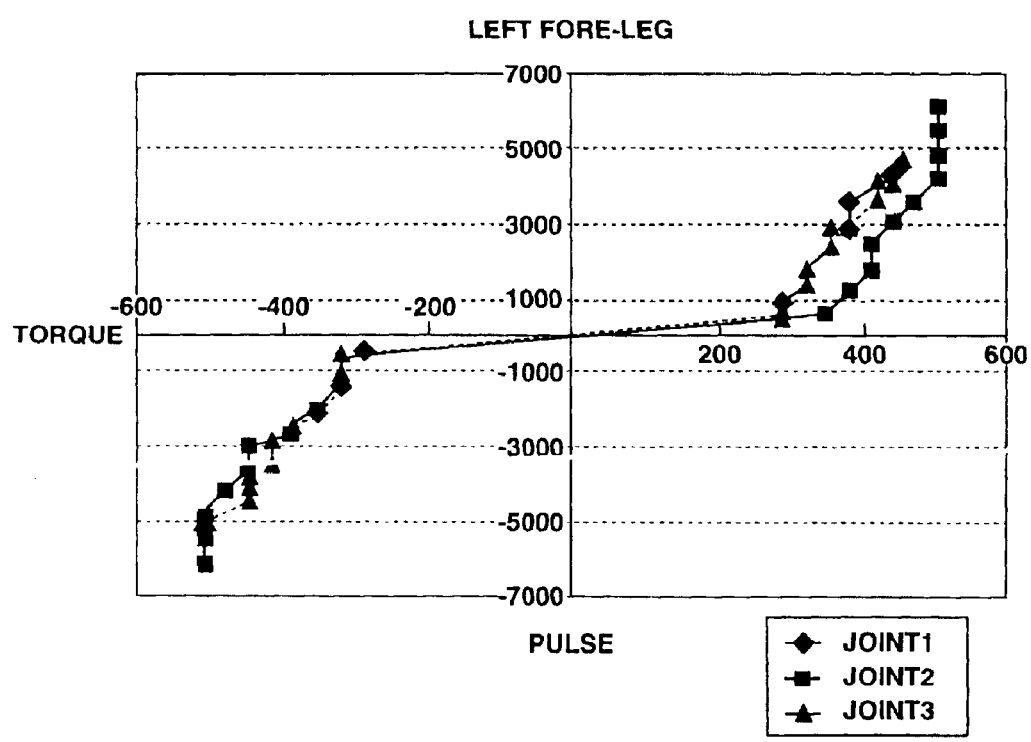
FIG. 15 is a characteristic graph showing the relation between PWM pulse and measured torque at the left fore-leg block.
Figure 16:
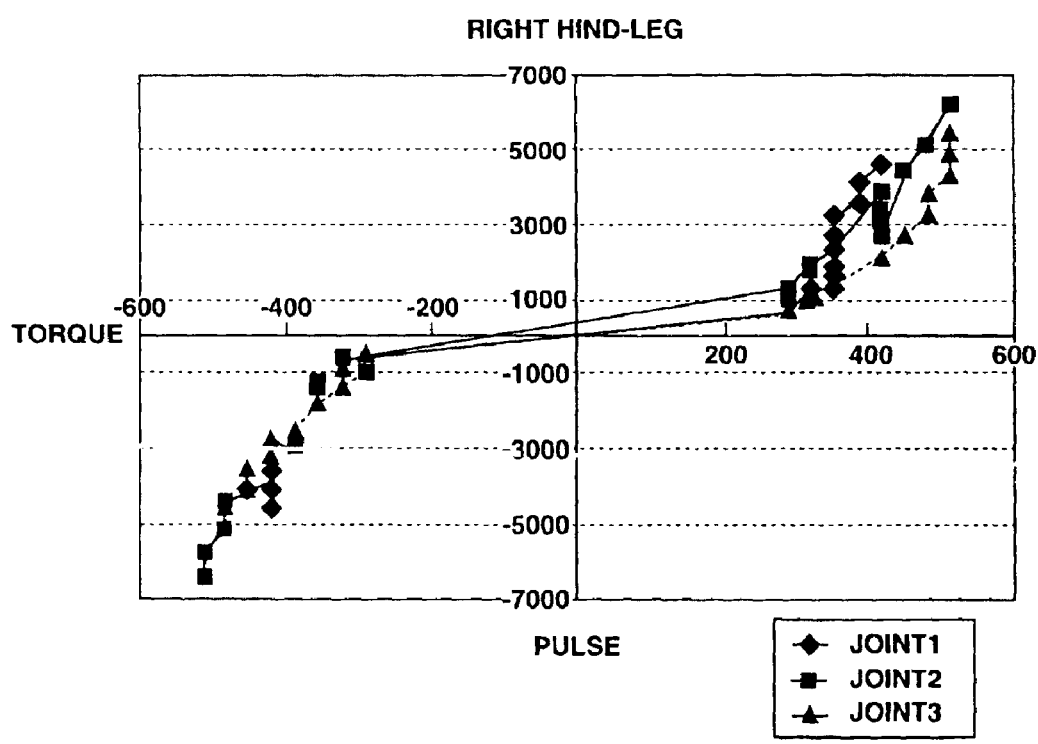
FIG. 16 is a characteristic graph showing the relation between PWM pulse and measured torque at the right hind-leg block.
Figure 17:
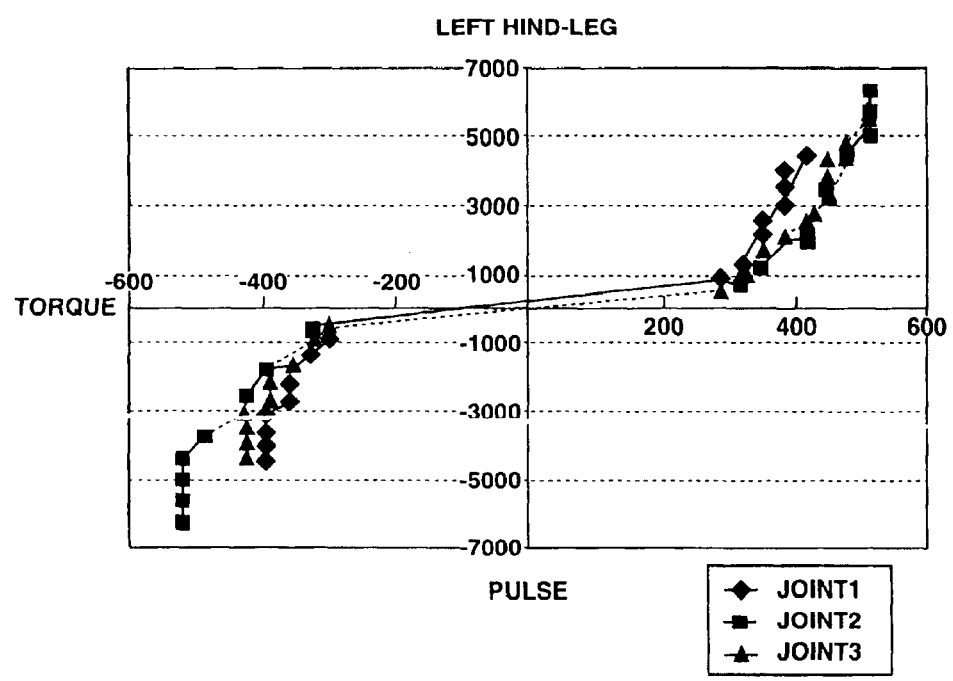
FIG. 17 is a characteristic graph showing the relation between PWM pulse and measured torque at the left hind-leg block.

The relation between a measured torque and PWM pulse is determined on the basis of a relational expression as follows:

FIGS. 14 to 17 graphically show the relation between a measured torque and PWM pulse for each of the leg blocks. In the graph, the vertical axis indicates the PWM pulse and the horizontal axis indicates the torque value. FIG. 14 shows the torque/PWM pulse relation for the right fore-leg block, FIG. 15 shows the torque/PWM pulse relation for the left fore-leg block, FIG. 16 shows the torque/PWM pulse relation for the right hind-leg block, and FIG. 17 shows the torque/PWM pulse relation for the left hind-leg block. Each of the relations at the fore-leg blocks (or hind-leg blocks) is a one between a torque at each of joints (joints 1 to 3) of each fore-leg block (or each hind-leg block), counted from the shoulder (or hip) to toe, and a PWM pulse. The torque was measured by pulling the leg block with a spring balance for example, and the width of the PWM pulse is a one acquired at that time.

As shown in FIGS. 14 to 17, the above relations for all the leg blocks are qualitatively the same as each other. For example, in all of the relations the torque shows no change (for example, the motor does not run) even when a PWM pulse exists, namely, there exists a so-called dead zone. For example, the dead zone is within a range of ±320. In such a dead zone, the torque is variable and thus unusable for determination of a force. Therefore, a range of PWM pulse usable to detect a force is selected, and a relation is determined, using a regression line, from a value of the selected range. Further, a regression line is computed for each of the joints and the values of regression line, thus computed, are averaged to acquire a relational expression.

As seen from FIGS. 14 to 17, the ranges of PWM pulse usable to detect a force are from +320 to +512 and from −320 to −512, respectively. A regression line used to determine a torque when the PWM pulse is within a range of +320 to +520 is given as the following formula (3):

$$y = 26 \times x - 7245 \quad (3)$$

where y is a torque value and x is a PWM pulse value. On the other hand, a regression line used to determine a torque when the PWM pulse is within a range of −320 to −512 is given as the following formula (4):

$$y = 28 \times x + 8051 \quad (4)$$

A relational expression indicating a relation between a measured torque and PWM pulse can be acquired as the above formula.

(2-1-2) Determination of the Relation Between Torque Measured by a Sensor or the Like and Torque (Computed Value) (Second Step)

Conversion of a torque applied to the robot apparatus 1 into a torque will be described herebelow.

(2-1-2-1) Force Sensor System

Figure 18:
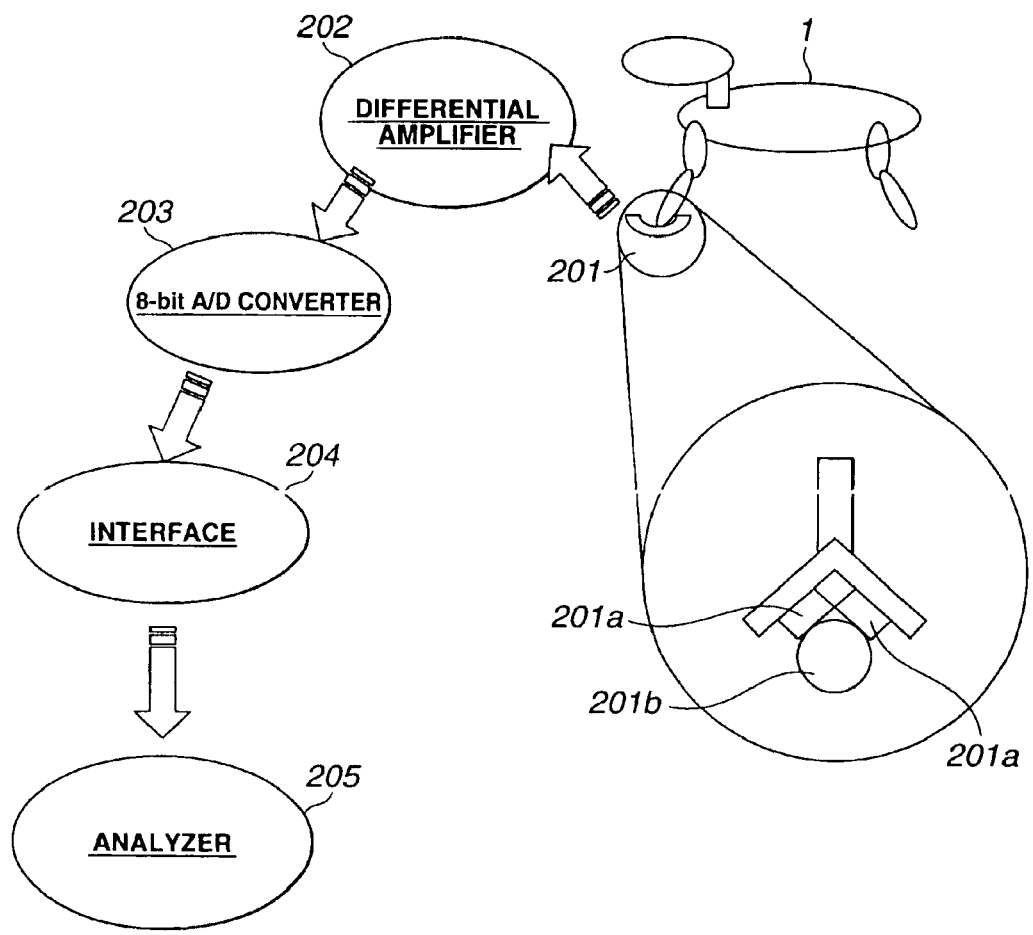
FIG. 18 shows the configuration of the force sensor system.

FIG. 18 shows a system to measure a force (will be referred to as "force sensor system" hereunder) applied to the robot apparatus 1. As shown, the force sensor system includes a sensor 201, differential amplifier 202, A/D converter 203, interface 204 and analyzer 205.

The sensor 201 is a triaxial force sensor, for example. The sensor 201 in this embodiment includes three uniaxial force sensors 201a disposed in three different directions and each in contact with a metal ball 201b. Because of this construction of the sensor 201, each force sensor 201a detects an external force applied to the metal ball 201b and generates a signal corresponding to the external force. For example, each force sensor 201a is a strain gauge, and the sensor 201 is a bridge circuit formed from such strain gauges.

The signal generated by the sensor 201 is supplied to the differential amplifier 202 in which it will be amplified and supplied to the A/D converter 203. The A/D converter 203 is an 8-bit data converter, for example. Data output from the A/D converter 203 is converted in voltage level by the interface 204 which is an RS232C or the like, and supplied to the analyzer 205.

The analyzer 205 analyzes the external force based on the data obtained by means of the sensor 201. The analyzer 205 thus acquires a direction and magnitude of the external force as external-force information. The analyzer 205 includes, for example, an analysis software and a personal computer (PC) which analyzes an external force applied to the robot apparatus 1 according to the description of the analysis software.

Figure 19:
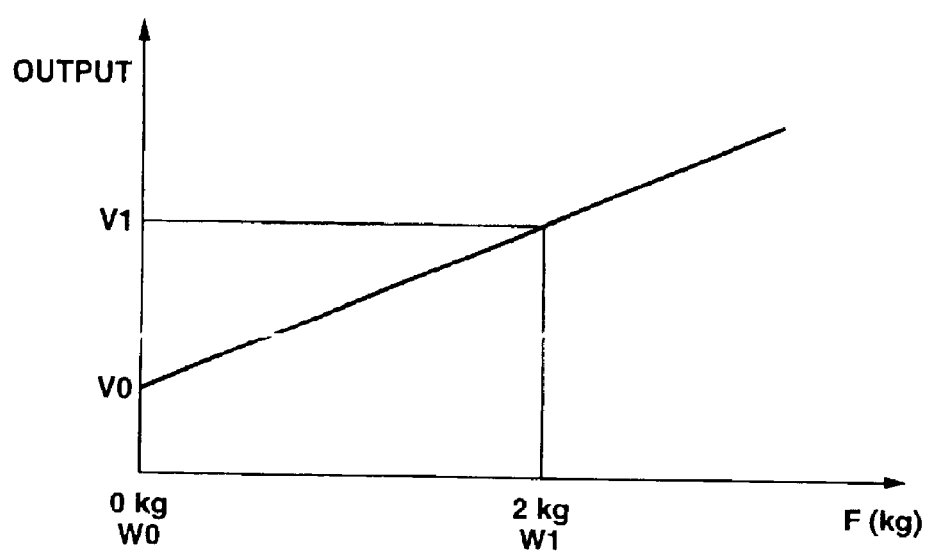
FIG. 19 is a characteristic graph showing the calibration used in explanation of the force sensor system.

FIG. 19 is a characteristic graph intended for calibration of external force. For the calibration, for example, a balance is used to check an output voltage provided from the differential amplifier 202 when the robot apparatus 1 is applied with a force. As will be seen from FIG. 19, the output voltage and weight are proportional with each other.

Taking a measured output voltage as V, a force F is given as follows:

$$V = V0 + F \times (V1 - V0)/(W1 - W0)$$

$$F = (V - V0) \times (W1 - W0)/(V1 - V0) \quad (5)$$

The force sensor system having been described above can be used to measure a force applied to the robot apparatus 1.

(2-1-2-2) Conversion of Measured Force into Torque

There will be described herebelow a conversion formula used to convert a force measured by the aforementioned force sensor system into a torque. The conversion formula is such that a force as an end effector is converted into a torque by modeling links of the robot apparatus 1.

Figure 20:
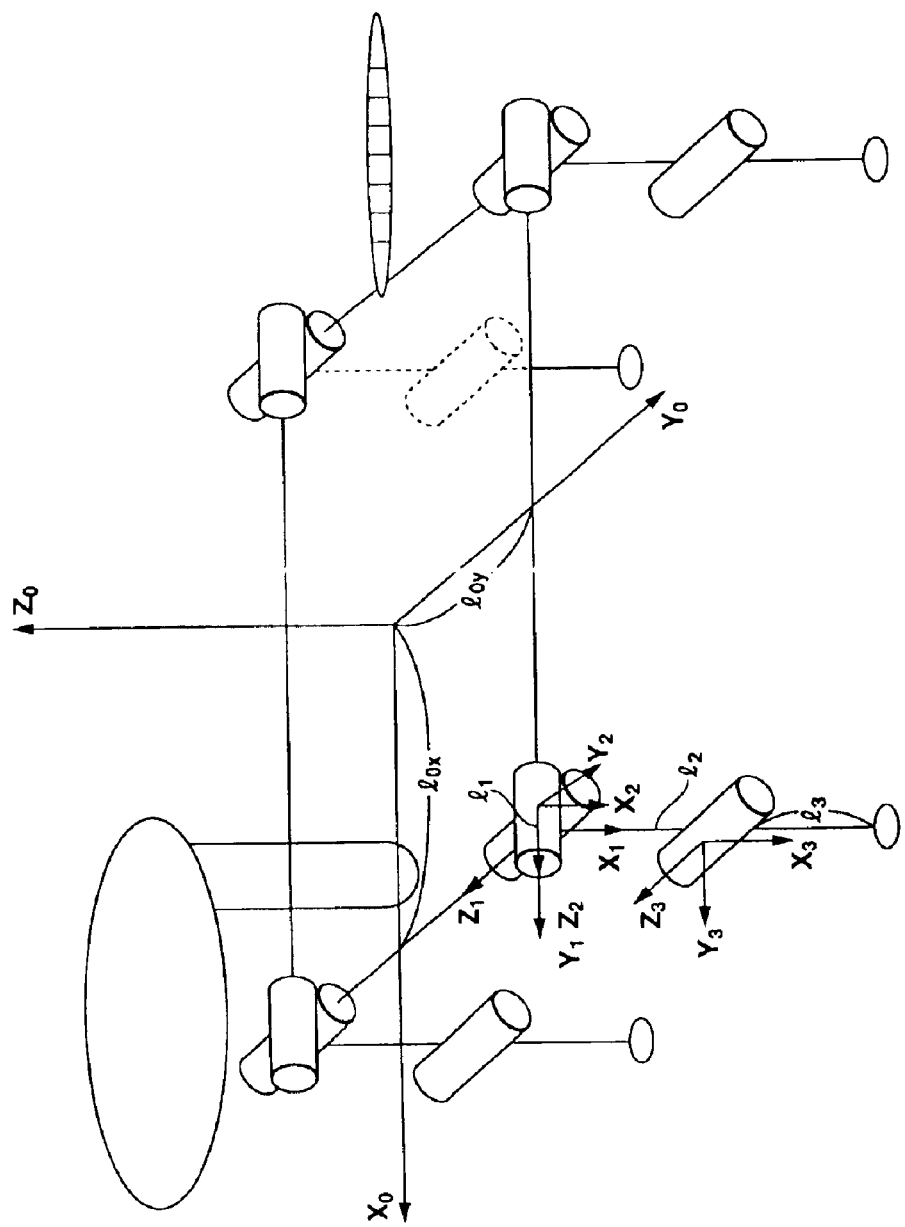
FIG. 20 shows the modeled links of the robot apparatus.

FIG. 20 shows a coordinate system of the modeled links of the robot apparatus 1. By modeling the links of the robot apparatus 1 as shown, a measured force can be converted into a torque.

This force/torque conversion uses the Jacobian matrix for example. For example, when a force as an end effector is taken as F and a torque required for each joint (link) when the force is applied to the robot apparatus 1 is taken as τ, the Jacobian matrix J can be used to establish a relation between the force and torque as given by the following formula (6):

$$\tau = J^T F \quad (6)$$

First, the force/torque conversion between a base coordinate system and link 1 is as follows. The base coordinate system is a coordinate for the body block 2 of the robot apparatus 1. The conversion provides a matrix given as the following formula (7) taking τ/2 about the x-axis, −τ/2 about the y-axis and θ1 about the z-axis:

$$^0T_1 = \begin{pmatrix} 1 & 0 & 0 & 0 \\ 0 & \cos\frac{\pi}{2} & -\sin\frac{\pi}{2} & 0 \\ 0 & \sin\frac{\pi}{2} & \cos\frac{\pi}{2} & 0 \\ 0 & 0 & 0 & 1 \end{pmatrix} \begin{pmatrix} \cos\left(-\frac{\pi}{2}\right) & -\sin\frac{\pi}{2} & 0 & 0 \\ \sin\left(-\frac{\pi}{2}\right) & \cos\left(-\frac{\pi}{2}\right) & 0 & 0 \\ 0 & 0 & 1 & 0 \\ 0 & 0 & 0 & 1 \end{pmatrix} \begin{pmatrix} \cos\theta_1 & -\sin\theta_1 & 0 & 0 \\ \sin\theta_1 & \cos\theta_1 & 0 & 0 \\ 0 & 0 & 1 & 0 \\ 0 & 0 & 0 & 1 \end{pmatrix} \quad (7)$$

$$
\begin{aligned}
&= \begin{pmatrix} 1 & 0 & 0 & 0 \\ 0 & 0 & -1 & 0 \\ 0 & 1 & 0 & 0 \\ 0 & 0 & 0 & 1 \end{pmatrix} \begin{pmatrix} 0 & 1 & 0 & 0 \\ -1 & 0 & 0 & 0 \\ 0 & 0 & 1 & 0 \\ 0 & 0 & 0 & 1 \end{pmatrix} \begin{pmatrix} \cos\theta_1 & -\sin\theta_1 & 0 & 0 \\ \sin\theta_1 & \cos\theta_1 & 0 & 0 \\ 0 & 0 & 1 & 0 \\ 0 & 0 & 0 & 1 \end{pmatrix} \\
&= \begin{pmatrix} 0 & 1 & 0 & l_{0x} \\ 0 & 0 & -1 & l_{0x} \\ -1 & 0 & 0 & 0 \\ 0 & 0 & 0 & 1 \end{pmatrix} \begin{pmatrix} \cos\theta_1 & -\sin\theta_1 & 0 & 0 \\ \sin\theta_1 & \cos\theta_1 & 0 & 0 \\ 0 & 0 & 1 & 0 \\ 0 & 0 & 0 & 1 \end{pmatrix} \\
&= \begin{pmatrix} \sin\theta_1 & \cos\theta_1 & 0 & l_{0x} \\ 0 & 0 & -1 & l_{0y} \\ -\cos\theta_1 & \sin\theta_1 & 0 & 0 \\ 0 & 0 & 0 & 1 \end{pmatrix}
\end{aligned}
$$

Also, the force/torque conversion between the links 1 and 2 provides a matrix given as the following formula (8):

$$
\begin{aligned}
{}^1T_2 &= \begin{pmatrix} 1 & 0 & 0 & 0 \\ 0 & \cos(-1\frac{\pi}{2}) & -\sin(-\frac{\pi}{2}) & 0 \\ 0 & \sin(-\frac{\pi}{2}) & \cos(-\frac{\pi}{2}) & 0 \\ 0 & 0 & 0 & 1 \end{pmatrix} \begin{pmatrix} \cos\theta_2 & -\sin\theta_2 & 0 & 0 \\ \sin\theta_2 & \cos\theta_2 & 0 & 0 \\ 0 & 0 & 1 & 0 \\ 0 & 0 & 0 & 1 \end{pmatrix} \begin{pmatrix} 1 & 0 & 0 & 0 \\ 0 & 1 & 0 & 0 \\ 0 & 0 & 1 & 0 \\ 0 & 0 & 0 & 1 \end{pmatrix} \\
&= \begin{pmatrix} \cos\theta_2 & -\sin\theta_2 & 0 & 0 \\ 0 & 0 & 1 & 0 \\ -\sin\theta_2 & -\cos\theta_2 & 1 & -l_1 \\ 0 & 0 & 0 & 1 \end{pmatrix}
\end{aligned} \tag{8}
$$

Also, the force/torque conversion between the links 2 and 3 provides a matrix given as the following formula (9):

$$
{}^2T_3 = \begin{pmatrix} \cos\theta_3 & -\sin\theta_3 & 0 & l_2 \\ 0 & 0 & -1 & 0 \\ \sin\theta_3 & \cos\theta_3 & 1 & 0 \\ 0 & 0 & 0 & 1 \end{pmatrix} \tag{9}
$$

Also the force/torque conversion between the link 3 and end effector provides a matrix given as the following formula (10):

$$
{}^2T_E = \begin{pmatrix} 1 & 0 & 0 & l_3 \\ 0 & 1 & 0 & 0 \\ 0 & 0 & 1 & 0 \\ 0 & 0 & 0 & 1 \end{pmatrix} \tag{10}
$$

By multiplying together the matrices between the base coordinate system and end effector, a matrix given as the following formula (11) for the force/torque conversion between the base coordinate system and end effector is provided:

$$
\begin{aligned}
{}^0T_E &= {}^0T_1\,{}^1T_2\,{}^2T_3\,{}^3T_E \\
&= \begin{pmatrix} S_1C_2C_3 + C_1S_3 & -S_1C_2C_3 + C_1C_3 & S_1S_2 & l_3(S_1C_2C_3+C_1S_3)+l_2S_1C_2+l_{0x} \\ S_2C_3 & -S_2S_3 & -C_2 & l_3S_2C_3+l_2S_2+l_{0y}+l_1 \\ -C_1C_2C_3 + S_1S_3 & C_1C_2S_3 + S_1C_3 & -C_1S_2 & l_3(-C_1C_2C_3+S_1S_3)-l_2C_1C_2 \\ 0 & 0 & 0 & 1 \end{pmatrix}
\end{aligned} \tag{11}
$$

Thus, the relations between the origin of the base coordinate system and end effector are given as the following formulae (12), (13), (14) and (15):

$$P_x = l_3(S_1C_2C_3+C_1S_3)+l_2S_1C_2+l_{0x}$$

$$P_y = l_3S_2C_3+l_2S_2+l_{0y}+l_1$$

$$P_z = l_3(-C_1C_2C_3+S_1S_3)-l_2C_1C_2 \tag{12}$$

$$dP_x/d\theta_1 = l_3(C_1C_2C_3+S_1S_3)+l_2C_1C_2$$

$$dP_x/d\theta_2 = l_3(-S_1S_2S_3)-l_2S_1S_2$$

$$dP_x/d\theta_3 = l_3(-S_1C_2S_3+C_1C_3) \tag{13}$$

$$dP_y/d\theta_1 = 0$$

$$dP_y/d\theta_2 = l_3C_2C_3+l_2C_2$$

$$dP_y/d\theta_3 = -l_3S_2S_3 \tag{14}$$

$$dP_z/d\theta_1 = l_3(S_1C_2C_3+C_1S_3)+l_2S_1C_2$$

$dP_z/d\theta_2 = l_3(C_1 S_2 C_3) + l_2 C_1 S_2$ $dP_z/d\theta_3 = l_3(C_1 C_2 S_3 + S_1 C_3)$ (15)

Based on the above results, the Jacobian matrix will be given by the following formula (16):

$$J = \begin{pmatrix} l_3(C_1 C_2 C_3 + S_1 S_3) + l_2 C_1 C_3 & l_3(-S_1 S_2 C_3) - l_2 S_1 S_2 & l_3(-S_1 C_2 S_3 + C_1 C_3) \\ 0 & l_3 C_2 C_3 + l_2 C_2 & -l_3 S_2 S_3 \\ l_3(S_1 C_2 C_3 + C_1 S_3) + l_2 S_1 C_2 & l_3(C_1 S_2 C_3 + l_2 C_1 S_2) & l_3(C_1 C_2 S_3 + S_1 C_3) \end{pmatrix}$$ (16)

By modeling the links of the robot apparatus 1 as above, it is possible to convert a force detected by the above-mentioned force sensor system into a torque through the conversion using the Jacobian matrix.

(2-1-3) Acquisition of Force Information Solely from a PWM Pulse computed for each joint using a relation between a measured torque and a torque determined by the conversion (Steps 3 and 4)

The measured torque is the one having been described in item (1-1-1), and the torque determined through the conversion is a one detected by the force sensor having been described in item (2-1-2).

Figure 21:
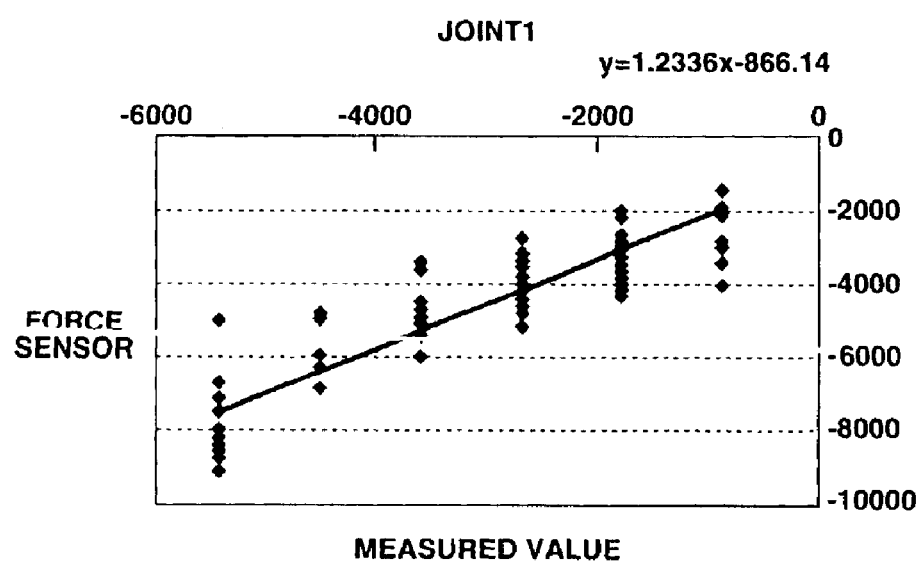
FIG. 21 is a characteristic graph showing the relation, at the joint 1, between a measured torque and a torque obtained through conversion of a force detected by the force sensor.
Figure 22:
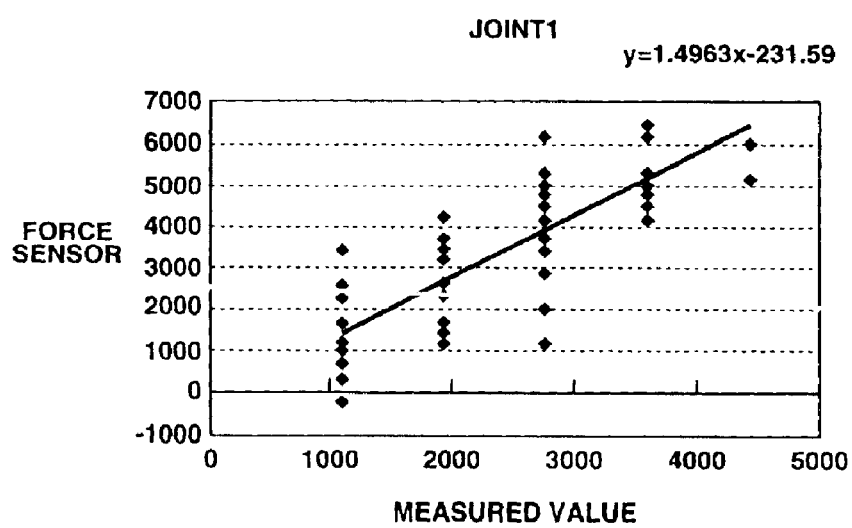
FIG. 22 is a characteristic graph showing the relation, at the joint 1, between a measured torque and a torque obtained through conversion of a force detected by the force sensor.
Figure 23:
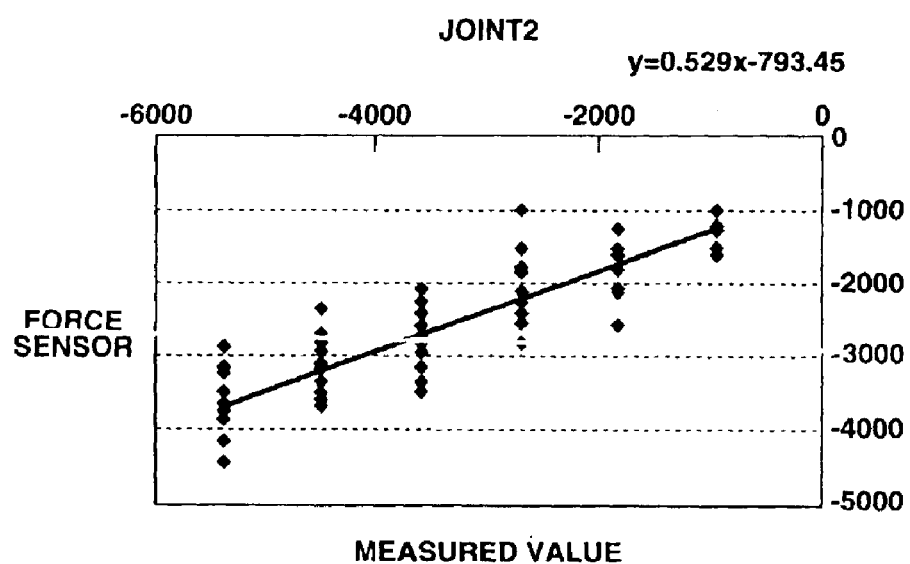
FIG. 23 is a characteristic graph showing the relation, at the joint 2, between a measured torque and a torque obtained through conversion of a force detected by the force sensor.
Figure 24:
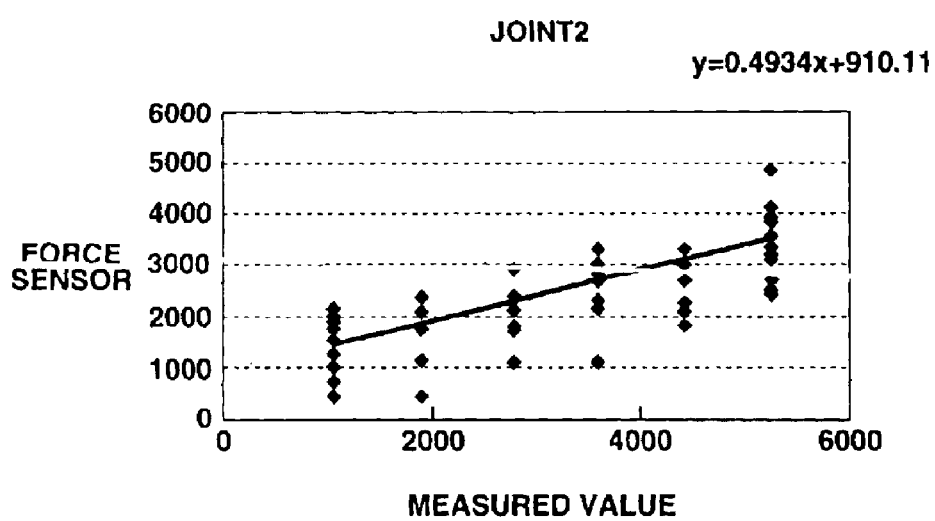
FIG. 24 is a characteristic graph showing the relation, at the joint 2, between a measured torque and a torque obtained through conversion of a force detected by the force sensor.
Figure 25:
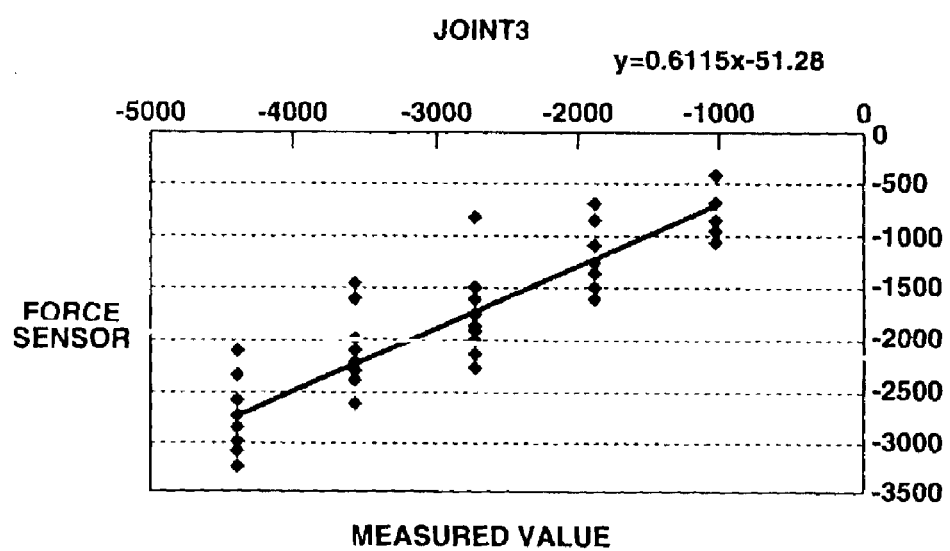
FIG. 25 is a characteristic graph showing the relation, at the joint 3, between a measured torque and a torque obtained through conversion of a force detected by the force sensor.
Figure 26:
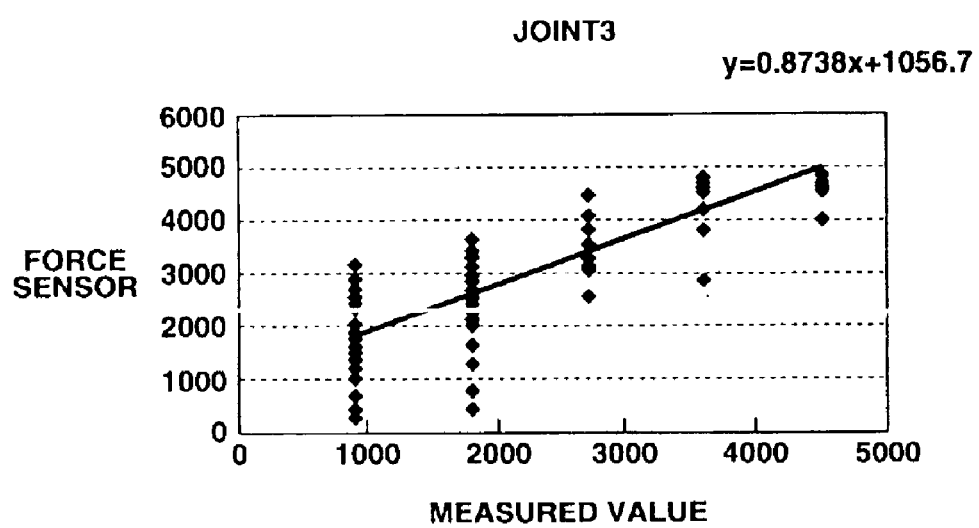
FIG. 26 is a characteristic graph showing the relation, at the joint 3, between a measured torque and a torque obtained through conversion of a force detected by the force sensor.

FIGS. 21 to 26 show, in the form of a characteristic graph, the relation between a measured torque and a torque obtained through the conversion of force detected by the force sensor. In each graph, the vertical axis indicates a torque (ForceSensor) obtained through the conversion (a value detected by the force sensor) while the horizontal axis indicates a measured torque (ApproxEqu). FIGS. 21 and 22 show the relation for the joint 1, FIGS. 23 and 24 show the relation at the joint 2, and FIGS. 25 and 26 show the relation for the joint 3. FIGS. 21, 23 and 25 show a positive region of the PWM pulse, and FIGS. 22, 24 and 26 show a negative region of the PWM pulse.

For the joint 1, the relation given by the following formula (17):

$y = 1.2336x - 866.14$ (as in FIG. 21)

$y = 1.4963x - 231.59$ (as in FIG. 22) (17)

where y is a torque obtained through the conversion, and x is a measured torque. This is also true for the subsequent formula. For the joint 2, the relation given by the following formula (18):

$y = 0.529x - 7893.45$ (as in FIG. 23)

$y = 0.4934x + 910.11$ (as in FIG. 24) (18)

For the joint 3, the relation given by the following formula (19):

$y = 0.6115x - 51.28$ (as in FIG. 25)

$y = 0.8738x + 1056.7$ (as in FIG. 26) (19)

An expression of a relation between a force and PWM pulse can be obtained based on the results as shown in FIGS. 21 to 26. The relational expression can be used to determine a force from a PWM pulse. It should be noted that the relation between a measured torque and a torque obtained through the conversion can also be obtained by any other than such a relational expression.

FIGS. 27 to 30 graphically show simulated values of an applied force, computed using the above-mentioned relational expression.

Figure 27:
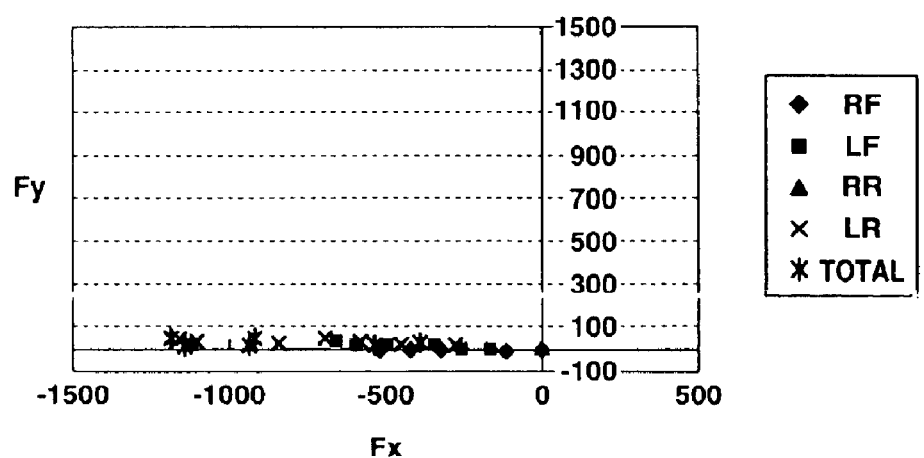
FIG. 27 is a characteristic graph showing simulated values of a force applied to the standing robot apparatus from the back.
Figure 28:
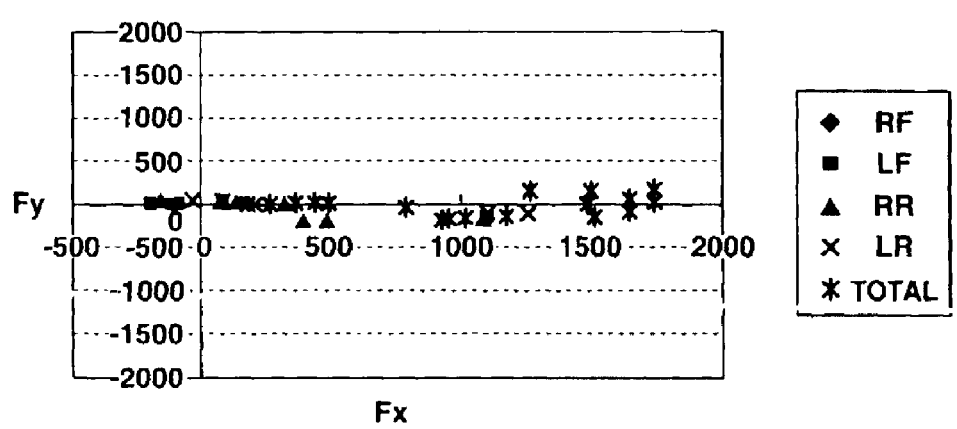
FIG. 28 is a characteristic graph showing simulated values of a force applied to the standing robot apparatus from the front.
Figure 29:
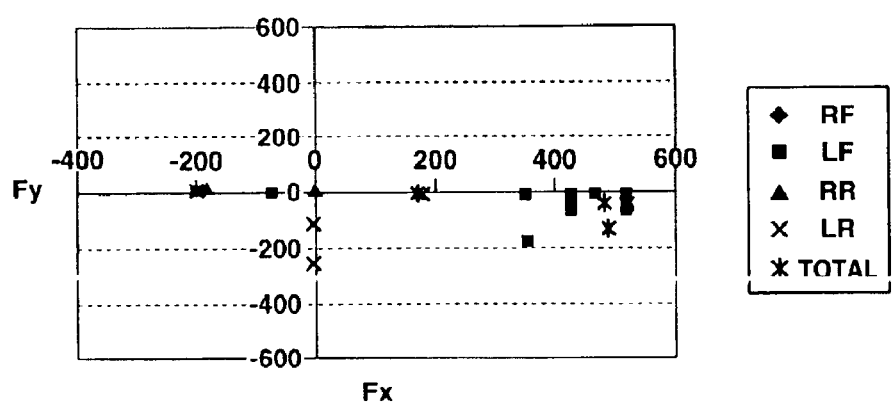
FIG. 29 is a characteristic graph showing simulated values of a force applied to the robot apparatus raising the left leg block while standing.

FIGS. 27 to 29 show simulated values of forces applied from various directions to the standing robot apparatus 1.

FIG. 27 is a characteristic graph showing simulated values of forces applied to the standing robot apparatus 1 from the back, FIG. 28 is a characteristic graph showing simulated values of forces applied to the standing robot apparatus 1 from the front, and FIG. 29 is a characteristic graph showing simulated values of forces applied to the robot apparatus 1 raising the left leg block while standing. For example, the application of a force to the robot apparatus 1 from the back as in FIG. 27 is intended to have the robot apparatus 1 lie down. In this case, it will be seen from FIG. 27 that the simulated values of the forces to both the right and left fore-leg blocks have well been computed and little force is applied to the hind-leg blocks because a force applied to the robot apparatus 1 from the back is concentrated to the fore-leg blocks.

Figure 30:
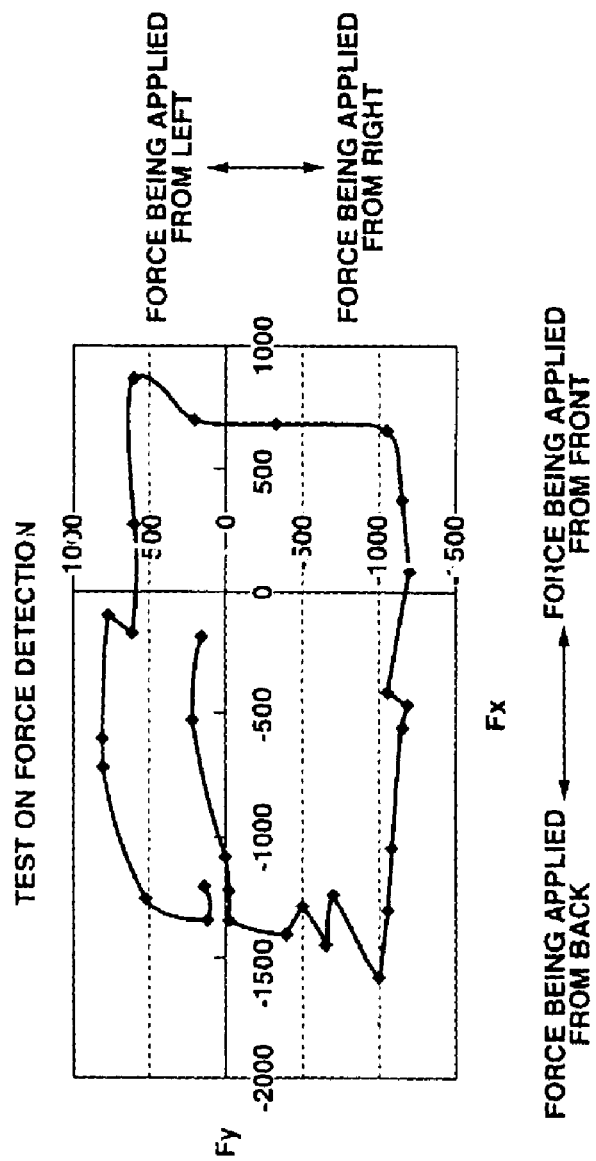
FIG. 30 is a characteristic graph showing simulated values of forces applied to the standing robot apparatus from the back, left, right and front, respectively, in this order.

FIG. 30 is a characteristic graph showing simulated values of forces applied to the standing robot apparatus 1 from the back, left, right and front, respectively, in this order. Namely, FIG. 30 shows results of application of a force from around the robot apparatus 1. "Fx" and "Fy" indicate forces applied horizontally. As seen from FIG. 30, the robot apparatus 1 positively detects forces applied from around it as above.

As above, information (magnitude, direction, etc.) about an external force applied to the robot apparatus 1 can be computed on the basis of a PWM pulse as a control signal.

Namely, the robot apparatus 1 can have the posture and operation thereof controlled according to a control signal and use the control signal to detect an external force applied thereto. For example, the robot apparatus 1 can also change its posture from one to another using an external force thus detected as a trigger signal.

Therefore, by pushing the tail block, for example, of the robot apparatus 1, the user can enjoy to have the latter make an action. In this case, the pushing by the user is a trigger signal.

Since the robot apparatus 1 detects an external force on the basis of an initially given control signal, it needs no dedicated sensor for detection of the external force. Thus, the robot apparatus 1 can detect an external force by a correspondingly simplified construction.

(3) Second Method of Detecting External Force in the Embodiment (3-1) External Force Detection in the Robot Apparatus 1

Next, the second method of detecting an external force in the robot apparatus 1 according to the present invention will be described.

In the robot apparatus 1, the kinematics and dynamics are applied to compute angles, in pitching and rolling directions, of the shoulder joints of the leg blocks 3A to 3D and target angles, in the pitching direction, of the knee joints during walking (the results of computation are taken as specified values), and control corresponding actuators 25 in the shoulder joint and knee joint mechanisms so that the pitching- and rolling-directional angles of the shoulder joints of the leg blocks 3A to 3D and pitching-directional angles of the knee joints are as specified. Thus the robot apparatus 1 can walk.

When the robot apparatus 1 collides with an obstacle while walking, the obstacle will counteract with the robot apparatus 1 to apply a force to the shoulder and knee joint mechanisms of the leg blocks 3A to 3D, so that the rotation of the shoulder and knee joints cannot attain the specified values in some cases.

To avoid the above, the robot apparatus 1 is designed to detect a difference between a specified value of the angle in the pitching direction of the shoulder joints, most sensitive to an obstacle, of the leg blocks 3A to 3D, given to the pitching-directional actuator 25 (will be referred to as "shoulder-joint pitching-directional actuator 25" hereunder), and an angle in the pitching direction, obtained based on an output from a potentiometer 26 corresponding to the shoulder-joint pitching-directional actuator 25 (will be referred to as "actual value" hereunder), and determine, when the detected difference is larger than a preset threshold, that it has collided with the obstacle. It should be noted that the above method for the fore-leg blocks 3A and 3D will be referred to as "first obstacle detecting method" while the method for the hind-leg blocks 3C and 3D will be referred to as "second obstacle detecting method", hereunder.

Figure 31:
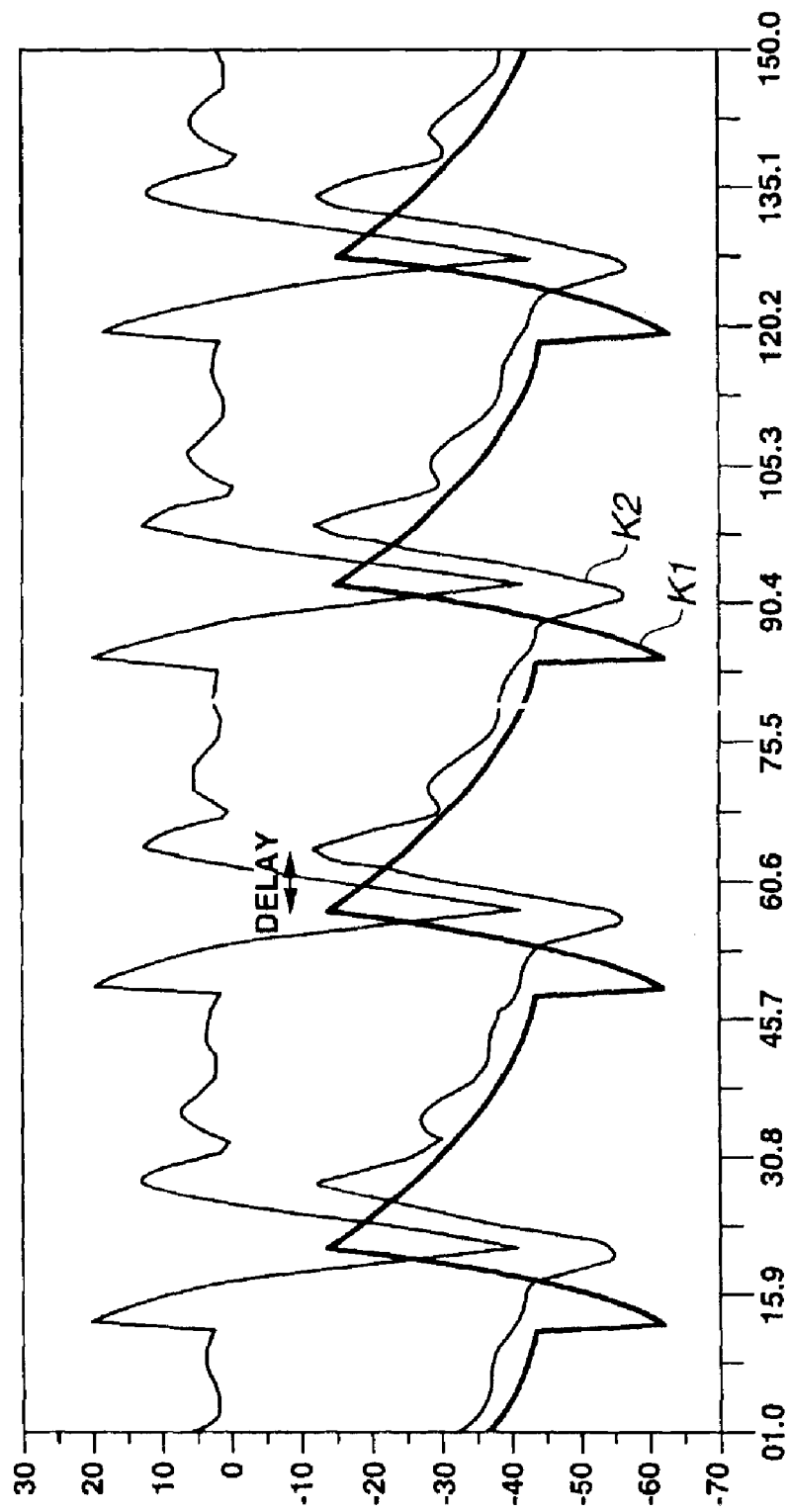
FIG. 31 shows waveforms showing the relations between specified amounts of motion for the pitching-directional actuator and actual amounts of motion the actuator has done.

FIG. 31 shows the relation between an amount of motion specified to the shoulder-joint pitching-directional actuator 25 of the leg blocks 3A to 3D and an actual amount of motion the actuator has done when there exists no obstacle. In FIG. 31, the reference K1 indicates an amount of motion specified to the shoulder-joint pitching-directional actuator 25, K2 indicates an actual amount of motion, and K3 indicates a difference between the specified and actual amounts of motion. As shown in FIG. 31, the specified and actual amounts of motion do not appear coincident with each other, which is caused by some delay taking place in the system after the amount of motion is specified to the actuator 25 until it is actually reflected by the actual amount of motion the actuator 25 has done. By shifting one of the graphs horizontally, the two graphs of the specified and actual amounts of motion will appear generally coincident with each other.

Figure 32:
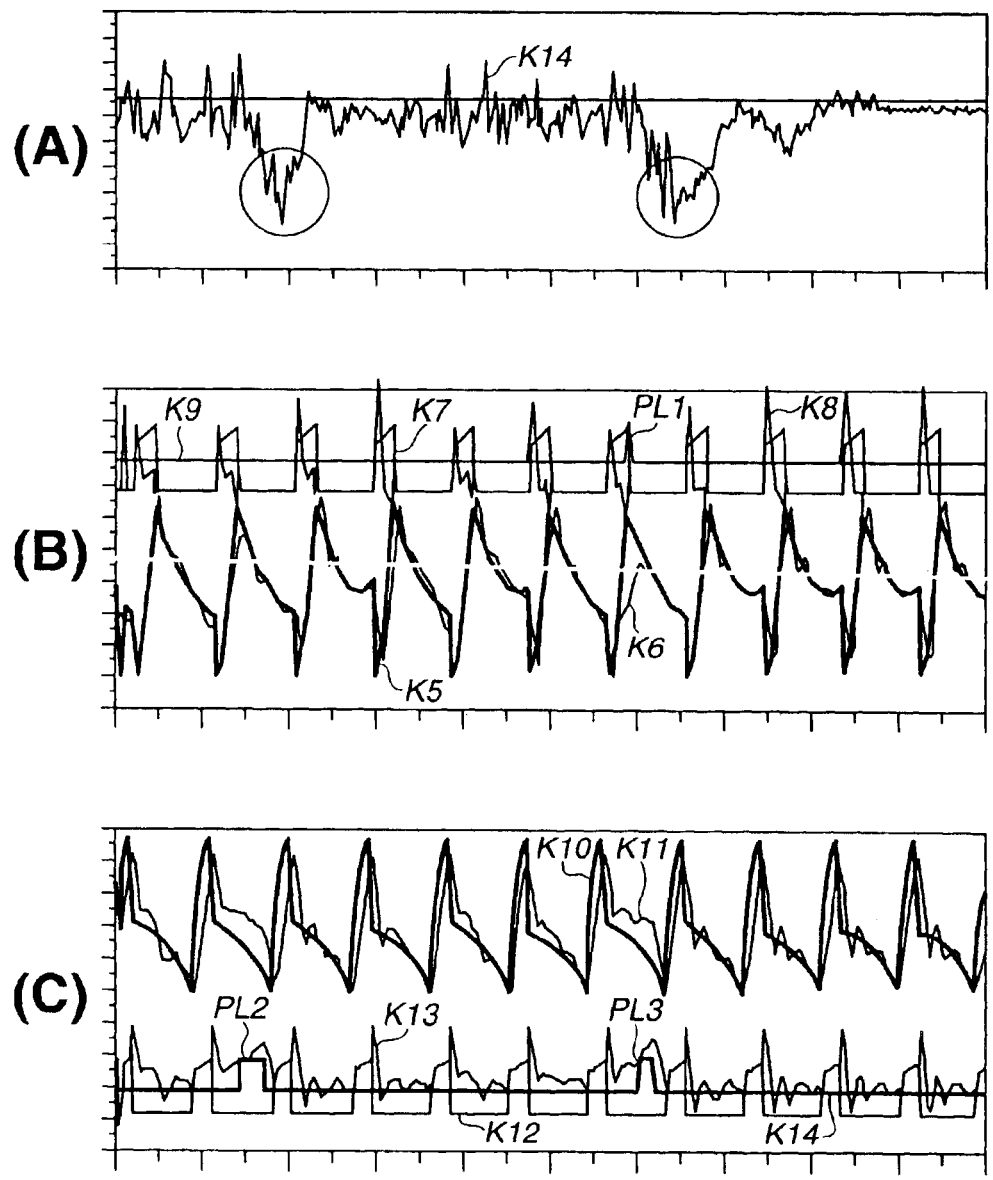
FIG. 32 shows waveforms showing the relations between specified and actual amounts of motion.

Of FIGS. 32A to 32C, FIG. 32A shows a waveform of an output K4 provided by the acceleration sensor 19 (in FIG. 5) when the robot apparatus 1 is made to walk and collides with an obstacle, and FIGS. 32B and 32C show the relations between an amount of motion specified to the shoulder-joint pitching-directional actuator 25 of the fore- and hind-leg blocks 3A to 3D and an actual amount of motion the actuator has done.

In FIG. 32B, the reference K5 indicates an amount of motion specified to the shoulder-joint pitching-directional actuator 25 of the fore-leg blocks 3A and 3B of the robot apparatus 1, and K6 indicates an actual amount of motion detected on the basis of the output from the potentiometer 26 corresponding to the actuator 25. The references K7 to K9 indicate an idling phase and landing phase of the fore-leg blocks 3A and 3B, a difference between the specified and actual amounts of motion, and a detection signal generated based on whether the difference is larger than a preset threshold, respectively.

Similarly, in FIG. 32C, the reference K10 indicates an amount of motion specified to the shoulder-joint pitching-directional actuator 25 of the hind-leg blocks 3C and 3D of the robot apparatus 1, K11 indicates an actual amount of motion detected on the basis of an output from the corresponding potentiometer 26, and K12 to K14 indicate an idling phase and landing phase of the hind-leg blocks 3C and 3D, a difference between the specified and actual amounts of motion, and a detection signal generated based on whether the difference is larger than a preset threshold, respectively.

As seen from FIGS. 32B and 32C, there are generated pulses PL1 to PL3 indicating that the robot apparatus 1 has collided with an obstacle just before it is overturned (shown as encircled in FIG. 32A), as detection signals concerning the hind-leg blocks 3C and 3D. More correctly, the pulses PL1 to PL3 indicate that the difference between the specified and actual amounts of motion is larger than the preset threshold. Therefore, it is possible to detect, the first and second obstacle detecting methods, that the robot apparatus 1 has collided with an obstacle.

However, if any factor other than a collision with an obstacle, such as a thick carpet on which the robot apparatus 1 walks, for example, causes a resistance against the actuation of the blocks 3A to 3D, the: first and second obstacle detecting methods will detect the resistance like a collision with an obstacle even if there is no actual obstacle, in some cases.

To prevent such an erroneous detection in the robot apparatus 1, the threshold for obstacle detection by a difference between specified and actual amounts of motion in the first and second obstacle detecting methods is set higher and another method (will be referred to as "third obstacle detecting method" hereunder) is used to detect a collision with an obstacle which cannot be detected by the first and second obstacle detecting methods.

Figure 33:
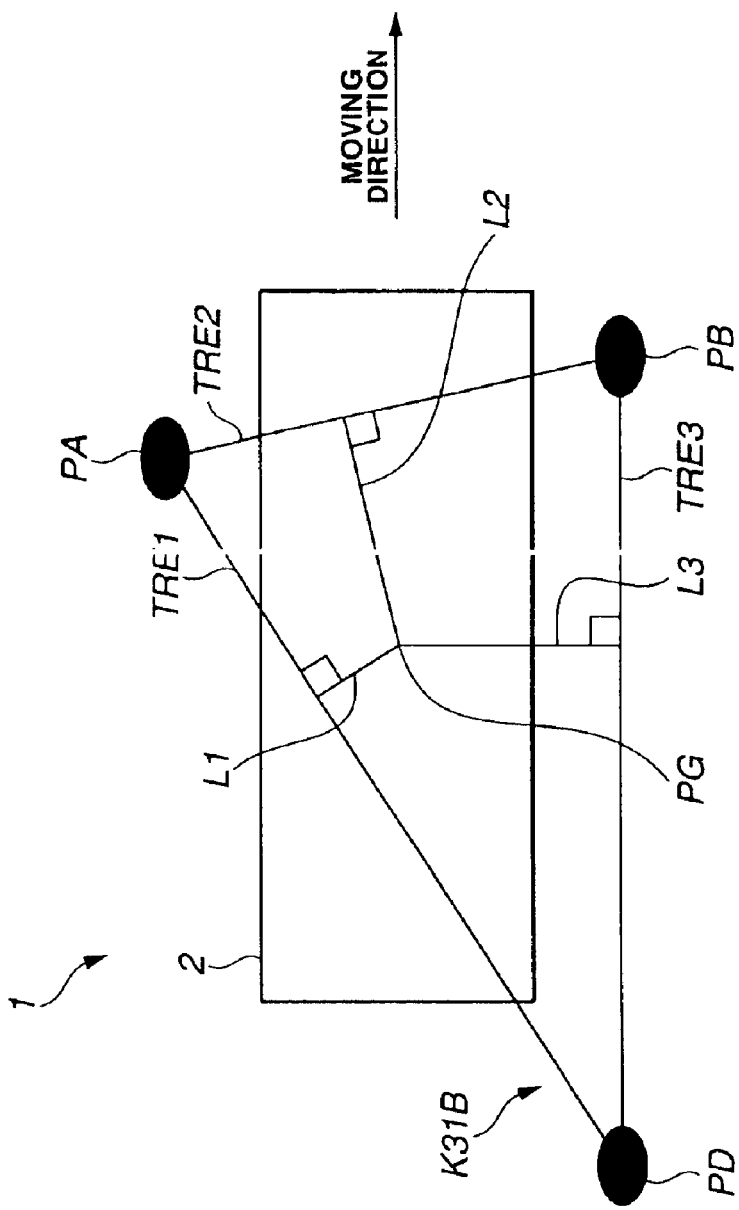
FIG. 33 is a conceptual diagram for explanation of the stability margin.

Actually, the robot apparatus 1 adopts a concept of "stability margin" in the third obstacle detecting method; FIG. 33 shows the concept of the stability margin. As will be seen, the stability margins are defined as distances L1 to L3 from a point defined by projecting the center of gravity of the robot apparatus 1 on the ground surface (will be referred to as "projected gravity-center point" hereunder) PG to sides TRE1 to TRE3 of a triangle TR defined by connecting points PA, PB and PD at which three of the leg blocks 3A to 3D (3A, 3B ad 3D in FIG. 33) are on the ground surface.

When any of the stability margins L1 to L3 takes a negative value, that is, when the projected gravity point PG is outside the triangle TR, the robot apparatus 1 will overturn. To avoid this, the posture of the robot apparatus 1 is always controlled while it is walking so that all the stability margins L1 to L3 will not take any negative value. However, when the robot apparatus 1 has collided with an obstacle, it will get out of postural balance so that any one of the stability margins L1 to L3 will go negative or the stability margins L1 to L3 will extremely be small while the stability margins L1 to L3 are not negative, and thus the robot apparatus 1 will not keep the postural stability.

In the robot apparatus 1, each of the stability margins L1 to L3 is always monitored during walking, and when any smallest one of the stability margins L1 to L3 is smaller than a preset threshold, it is determined that the robot apparatus 1 has collided with an obstacle.

FIG. 33 shows the relation between a theoretical value and measured value of the smallest one of the stability margins L1 to L3, which is when the robot apparatus 1 does not actually collide with an obstacle. In FIG. 33, the reference K20 indicates a theoretical value, K21 indicates a measured value, and K22 indicates an idling phase and landing phase of the leg blocks 3A to 3D.

Figure 34:
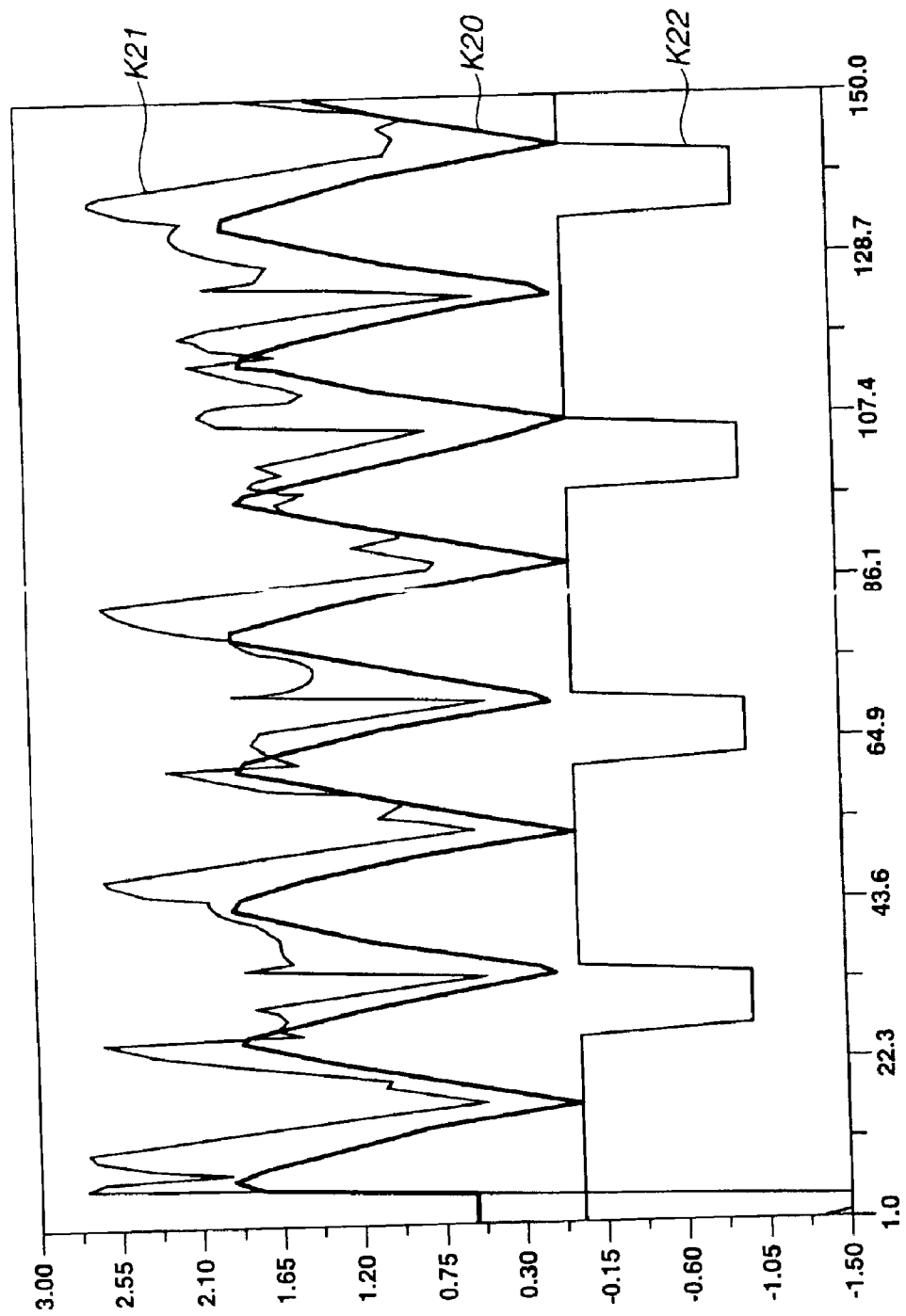
FIG. 34 shows waveforms for explanation of the stability margin.

As also evident from FIG. 34, when the robot apparatus 1 does not collide with any obstacle, the theoretical and measured values of the smallest stability margins L1 to L3 change in the generally same phase. Therefore, it will be known that the third obstacle detecting method can be used to detect a collision of the robot apparatus 1 with an obstacle.

Thus, the robot apparatus 1 uses these first to third obstacle detecting methods one after another to determine whether it has collided with an obstacle while walking. When it determines that it has collided with an obstacle, it makes a predetermined action against overturn by changing the walking manner, walking direction and the like, whereby it can effectively prevent itself from being overturned due to the collision with an obstacle.

Figure 35:
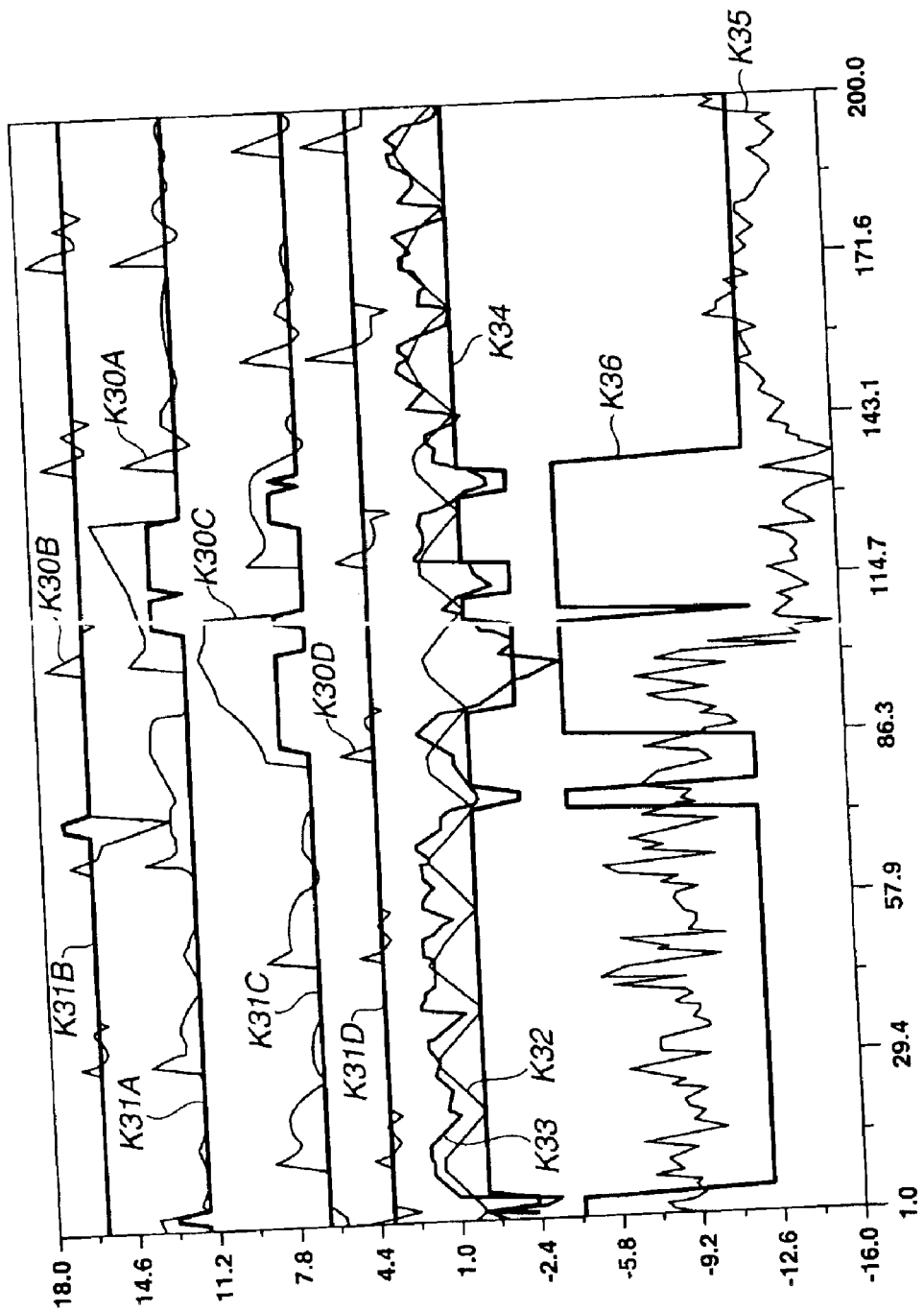
FIG. 35 shows waveforms for explanation of the detection of an obstacle by the first to third obstacle detecting methods.
Figure 36:
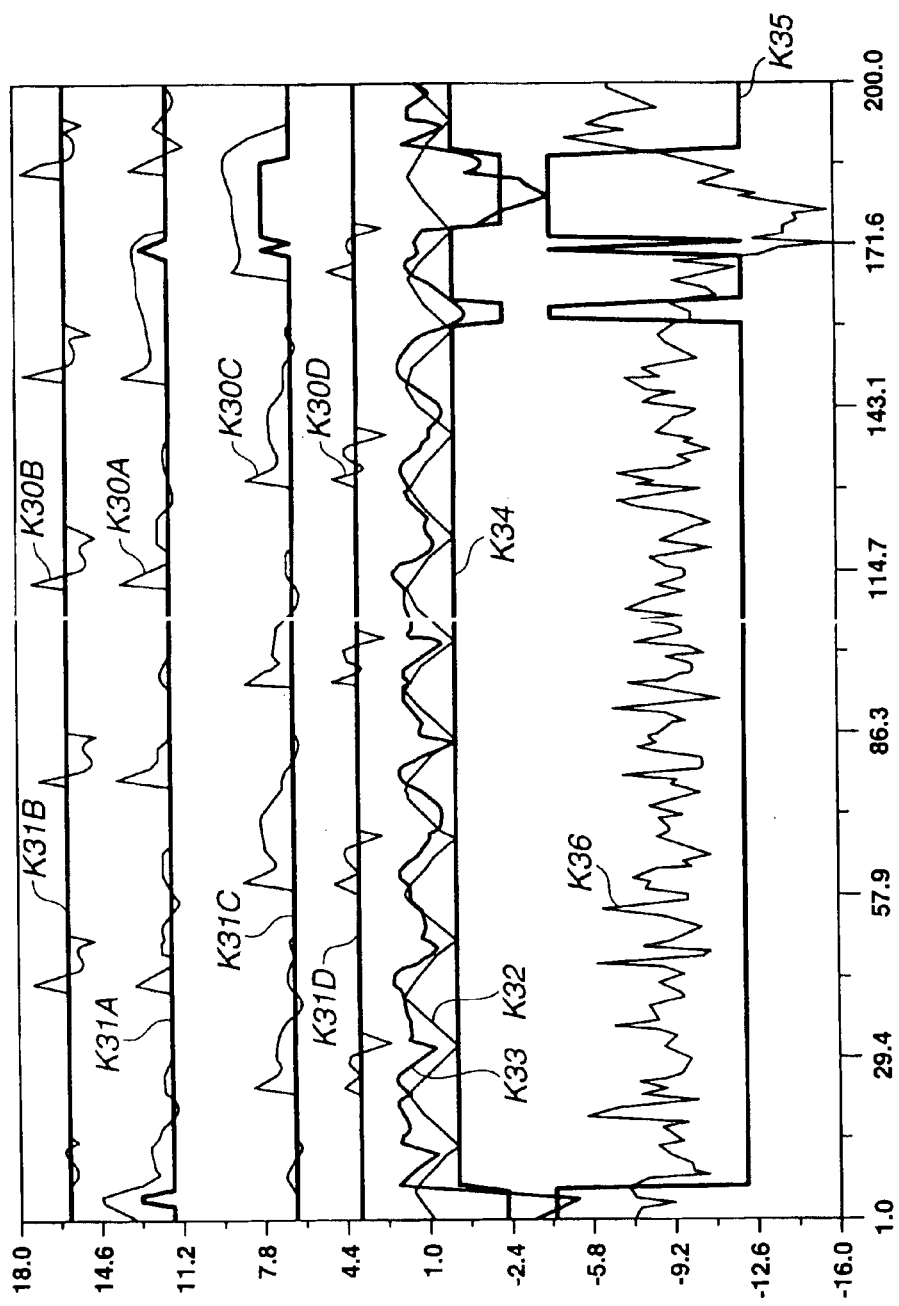
FIG. 36 shows waveforms for explanation of the detection of an obstacle by the first to third obstacle detecting methods.
Figure 37:
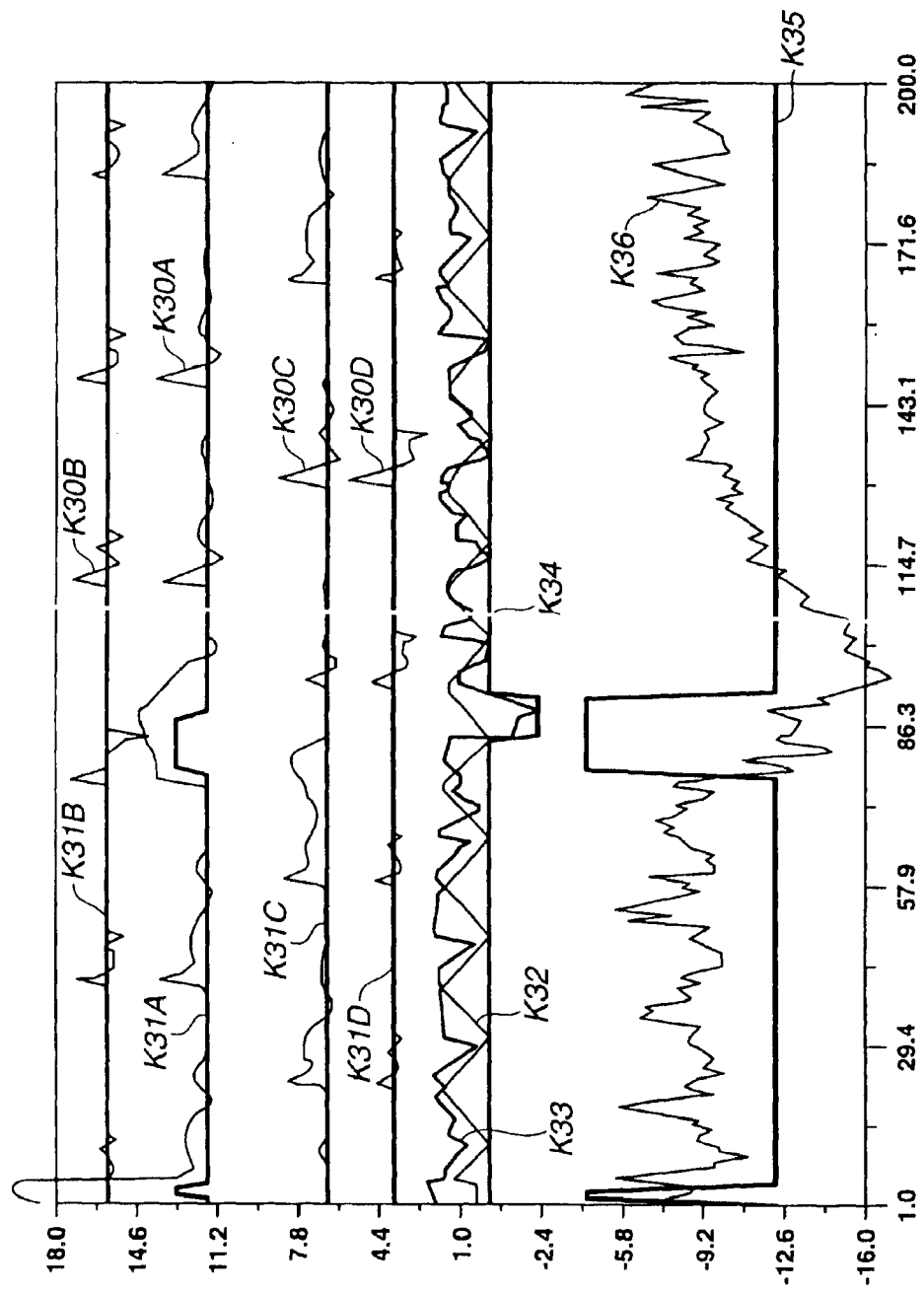
FIG. 37 shows waveforms for explanation of the detection of an obstacle by the first to third obstacle detecting methods.

FIGS. 35 to 37 show the results of obstacle detection by the first to third obstacle detecting methods.

Each of FIGS. 35 to 37 shows five waveforms. The top four graphs show differences (K30B, K30A, K30C and K30D), respectively, between amounts of motion specified to the shoulder-joint pitching-directional actuators 25 of the leg blocks 3B, 3A, 3C and 3D, that is, right fore-leg, left fore-leg, left hind-leg and right hind-leg blocks, and actual amounts of motion the actuators have made, and detection signals (K31B, K31A, K31C and K31D), respectively, generated depending upon whether the difference is larger than the preset threshold.

The fifth graph in FIGS. 35 to 37 show a theoretical value (K32) and measured value (K33) of the smallest one of the stability margins L1 to L3, and a detection signal (K34) produced depending on whether the measured value is smaller than the preset threshold and intended to detect, by the second obstacle detecting method, whether the robot apparatus 1 has collided with any obstacle.

In FIGS. 35 to 37, the bottom graphs show an acceleration sensor output (K35) and a detection signal (K36) indicating the result of final obstacle detection by the first and second obstacle detecting methods.

Of FIGS. 35 to 37, FIG. 35 shows that a collision with an obstacle is detected by the first obstacle detecting method just before the robot apparatus 1 gets out of postural balance, FIG. 36 shows that the collision is detected by the third obstacle detecting method, and FIG. 37 shows that the collision is detected by the second obstacle detecting method just before the robot apparatus 1 is overturned.

Thus, as seen from FIGS. 35 to 37, it could be made sure that the collision with an obstacle can be detected positively and with a high accuracy by the first to third obstacle detecting methods before the robot apparatus 1 is overturned.

Figure 38:
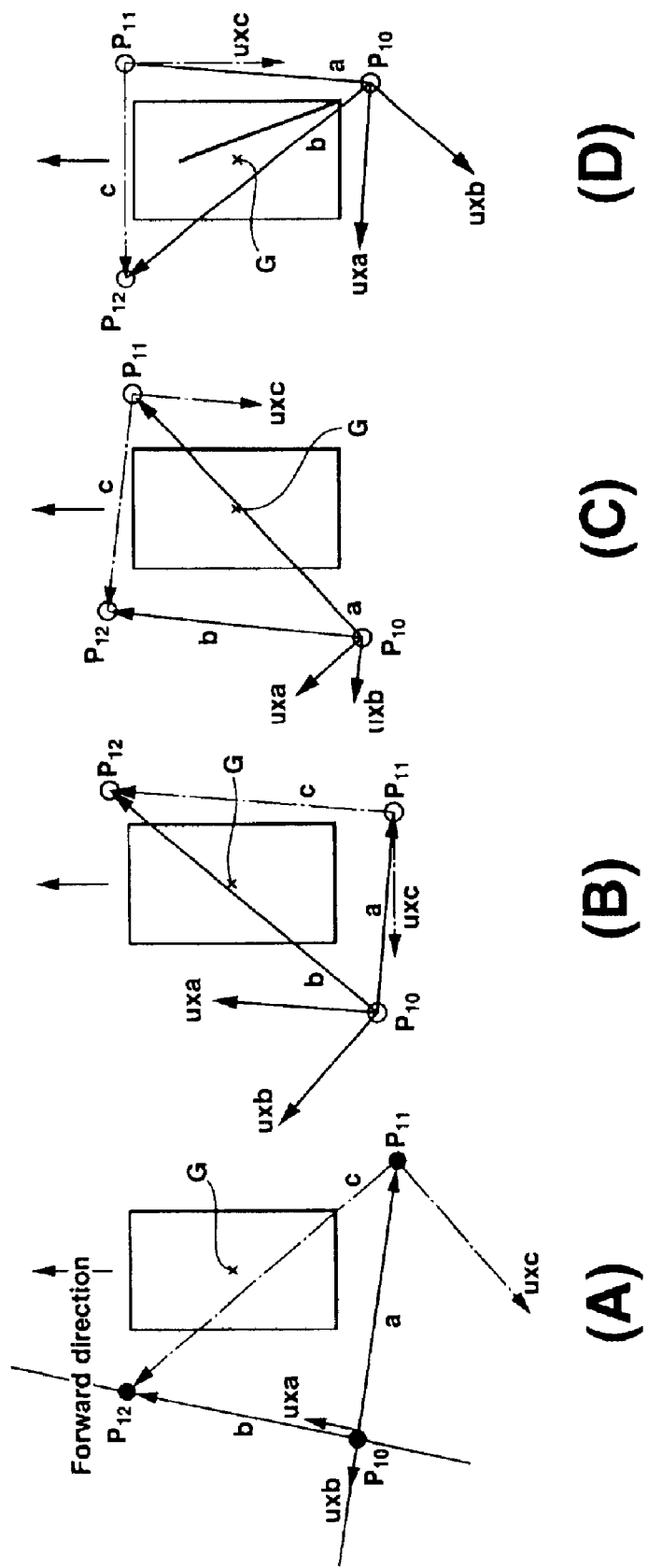
FIG. 38 is a conceptual diagram for explanation of the stability margin computation.

A concrete method of computing a stability margin will be described below:

First, points where three of the leg blocks are on the ground surface are taken as $P_{10}$, $P_{11}$ and $P_{12}$, respectively, as shown in FIG. 38, the kinematics is used to determine coordinates of the points $P_{10}$, $P_{11}$, and $P_{12}$ in a three-dimensional space on the basis of joint angles of the leg blocks.

Next, unit vectors a, b and c of vectors $P_{10}P_{11}$, $P_{10}P_{12}$ and $P_{11}P_{12}$ are determined by the following formulae (20), (21) and (22):

$$P_{10}P_{11}/\|P_{10}P_{11}\|=a \quad (20)$$

$$P_{10}P_{12}/\|P_{10}P_{12}\|=b \quad (21)$$

$$P_{11}P_{12}/\|P_{11}P_{12}\|=c \quad (22)$$

Then, a directional vector u being a unit vector of an outer product of the vectors a and b is computed using the following formula (23):

$$u=a\times b/\|1\times t\| \quad (23)$$

Further, the center of gravity of the robot apparatus 1 is taken as G, and an inner product of the outer product (u×a) of the directional vector u and vector a and a vector P1G is computed using the following formula (24). Thus, a stability margin $s_{m1}$ corresponding to the side $P_{10}P_{11}$ can be determined:

$$S_{m1}=(u\times a)P_1G \quad (24)$$

Note that since the directional vector u and vector a are orthogonal to each other, the outer product (u×a) is "1".

Also, a stability margin sm2 corresponding to the side $P_{10}P_{11}$ can be determined similarly by computing an inner product of an outer product (u×b) of the directional vector u and vector b and vector $P_1G$ using the following formula (25):

$$S_{m2}=(u\times b)P_1G \quad (25)$$

Also, a stability margin $s_{m3}$ corresponding to the side $P_{11}P_{12}$ can be determined by computing an inner product of an outer product (u×c) of the directional vector u and vector c and vector $P_2G$ using the following formula (26):

$$S_{m3}=(u\times c)P_1G \quad (26)$$

A smaller one of these three stability margins $s_{m1}$, $s_{m2}$ and $s_{m3}$ thus computed is selected for comparison with a preset threshold, and the third obstacle detecting method can be used to determined whether the robot apparatus 1 has collided with an obstacle.

(3-2) Obstacle Detecting Procedure RT1

Figure 39:
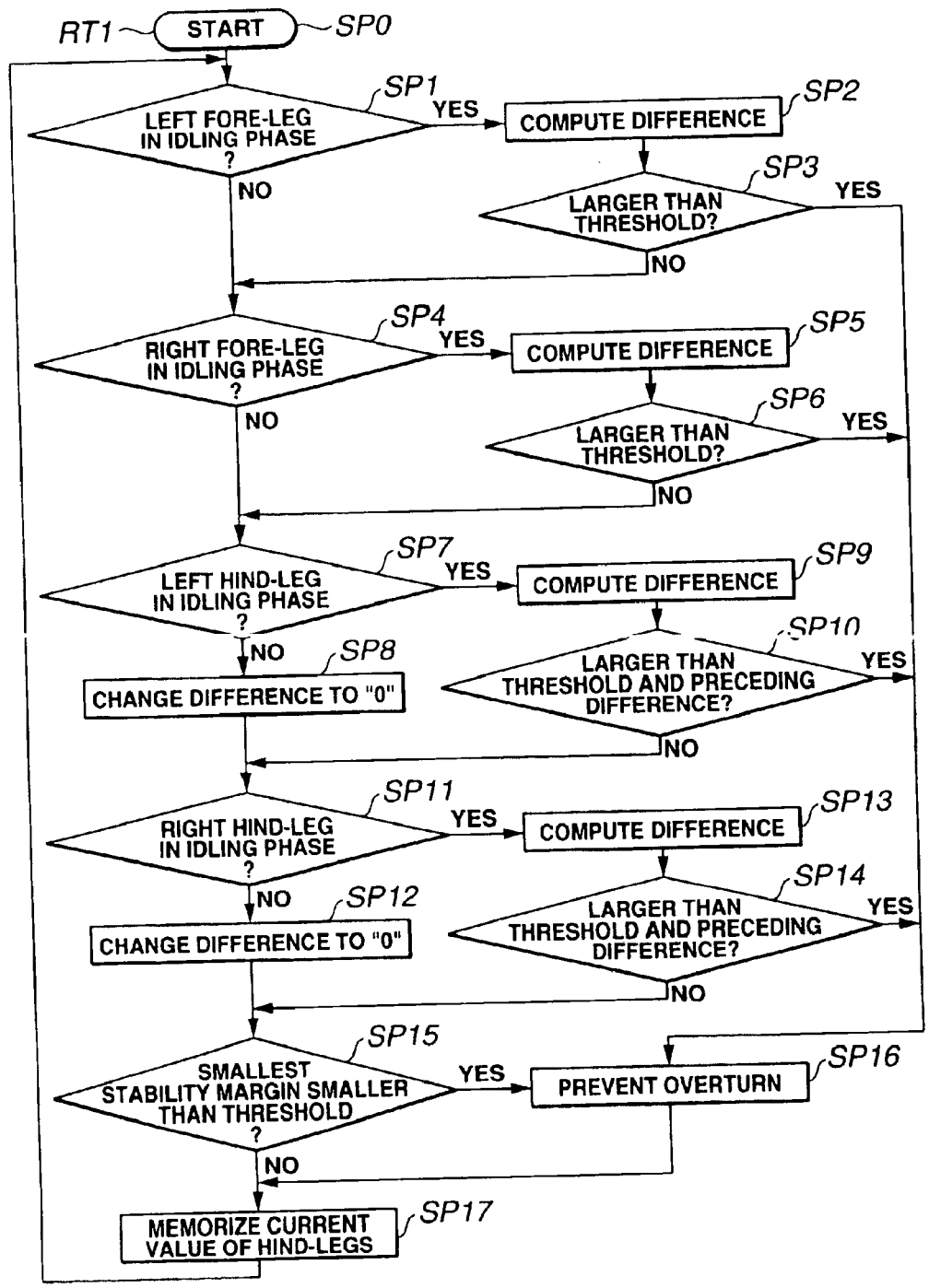
FIG. 39 shows a flow of operations made for detecting an obstacle.

The aforementioned obstacle detection in the robot apparatus 1 is done by a CPU 10 (shown in FIG. 4) following an obstacle detecting procedure RT1 shown in FIG. 39.

In step SP0, the CPU 10 starts the obstacle detecting procedure RT1 at the same time as the robot apparatus 1 starts walking. In step SP1, it determines whether the left fore-leg block 3B is in the idling phase.

If the CPU 10 has determined in step SP1 that the left fore-leg block 3B is not in the idling phase, it goes to step SP4. On the contrary, if the CPU 10 has determined in step SP1 that the left fore-leg block 3B is in the idling phase, it goes to step SP2 where it will compute a difference between the last specified amount of motion the CPU 10 has given to the shoulder-joint pitching-directional actuator 25 in the left fore-leg block 3B and a concurrent actual amount of motion in the pitching direction of the shoulder joint, obtained based on an output from the potentiometer 26 corresponding to the pitching-directional actuator 25.

Next in step SP3, the CPU 10 determines whether the difference computed in step SP2 is larger than a predetermined threshold. It should be noted that in this embodiment, the threshold is set to 18 (deg.).

If the result of the determination in step SP3 is negative, the CPU 10 goes to step SP4 where it will determine whether the right fore-lg block 3A is in the idling phase. If the right fore-leg block 3A is in the idling phase, the CPU 10 goes to step SP5 where it will compute a difference between the last specified amount of motion the CPU 10 has given to the shoulder-joint pitching-directional actuator 25 in the right fore-leg block 3A and a concurrent actual amount of motion in the pitching direction of the shoulder joint, obtained based on an output from the potentiometer 26 corresponding to the pitching-directional actuator 25. Next in step SP6, the CPU 10 determines whether the difference computed in step SP5 is larger than a predetermined threshold (18 deg.).

Thus in steps SP1 to SP6, the CPU 10 determines, by the first obstacle detecting method, whether the robot apparatus 1 has collided with any obstacle. If the CPU 10 has detected a collision with an obstacle by obtaining an affirmative result in step SP3 or SP6, it goes to step SP16 where it will provide a predetermined overturn prevention by causing the robot apparatus 1 to walk in a different manner or direction. Then, the CPU 10 goes to step SP17 where it will store current values of the hind-leg blocks, and goes back to step SP1 where it will start the obstacle detecting procedure RT1 again.

On the contrary, if the CPU 10 has obtained a negative result of the determination in step SP4 or SP6, namely, it has not detected any such collision by the first obstacle detecting method, it goes to step SP7 where it will determine whether the left hind-leg block 3D is in the idling phase.

If the result of the determined by the CPU 10 in step SP7 is negative, the CPU 10 goes to step SP8 where it will provisionally memorize that the difference between the last specified amount of motion the CPU 10 has given to the shoulder-joint pitching-directional actuator 25 in the left hind-leg block 3C and a concurrent actual amount of motion in the pitching direction of the shoulder joint, obtained based on an output from the potentiometer 26 corresponding to the pitching-directional actuator 25 is "0", and then goes to step SP11.

On the contrary, if the result of the determination in step SP7 is affirmative, the CPU 10 goes to step SP 9 where it will compute the above difference, and then goes to step SP10 where it will determine whether the difference computed in step SP9 is larger than a preset threshold and the difference is larger than the preceding one (whether the difference has increased). In this embodiment, the preset threshold is set to 15 (deg.).

If the result of the determination in step SP10 is negative, the CPU 10 goes to step SP11 where it will determine whether the right hind-lg block 3D is in the idling phase. If the right hind-leg block 3D is in the idling phase, the CPU 10 goes to step SP13 where it will compute a difference between the last specified amount of motion the CPU 10 has given to the shoulder-joint pitching-directional actuator 25 in the right hind-leg block 3D and a concurrent actual amount of motion in the pitching direction of the shoulder joint, obtained based on an output from the potentiometer 26 corresponding to the pitching-directional actuator 25. Next in step SP14, the CPU 10 determines whether the difference computed in step SP13 is larger than the preceding difference.

Thus in steps SP7 to SP14, the CPU 10 determines, by the second obstacle detecting method, whether the robot apparatus 1 has collided with any obstacle. If the CPU 10 has detected a collision with an obstacle by obtaining an affirmative result of the determination in step SP10 or SP14, it goes to step SP16 where it will provide the above-mentioned predetermined overturn prevention.

Further in step SP17, the CPU 10 changes the difference obtained for the left or right hind-leg block 3C or 3D and concurrently memorized therein to a value obtained in step SP9 or SP14, and then goes to step SP1 where it will start again the obstacle detecting procedure RT1.

On the contrary, if the CPU 10 has obtained a negative result of the determination in step SP10 or SP14, namely, it has not detected any such collision, it goes to step SP15 where it will determine, by the third obstacle detecting method, whether the robot apparatus 1 has collied with an obstacle.

Namely in step SP15, the CPU 10 computes, by the formula (1) to (7), each of the concurrent three stability margins L1 to L3 (in FIG. 33) and determines whether the smallest one of the stability margins L1 to L3 is larger than a preset threshold. It should be noted that in this embodiment; this threshold is set to 2 (mm).

Note that if the result of the determination in step SP15 is affirmative, it means that a collision with an obstacle has been detected by the third obstacle detecting method. At this time, the CPU 10 goes to step SP16 where it will provide the aforementioned overturn prevention, then to step SP17 where it will change the difference concurrently memorized therein for the left or right hind-leg block 3C or 3D to a value (0) having provisionally been memorized in step SP8 or SP12, and returns to step SP1 where it will start the obstacle detecting procedure RT1 again.

On the contrary, if the result of the determination in step SP15 is negative, it means that no collision of any obstacle has been detected by any of the first to third obstacle detecting methods. In this case, the CPU 10 goes to step SP17 where it will change the difference for the left or right hind-leg block 3C or 3D to the value (0) having provisionally been memorized in step SP8 or SP12, and then returns to step SP1 where it will start the obstacle detecting procedure RT1 again.

The CPU 10 sequentially repeats the obstacle detecting procedure RT1 while the robot apparatus 1 is walking, whereby controlling the walking of the robot apparatus 1 so that the latter will not be overturned even when it has collided with an obstacle.

(4) Function and Effect of the Second External Force Detecting Method

Based on a specified amount of motion the CPU 10 has given to the shoulder-joint pitching-directional actuator 25 of any idling one of the leg blocks 3A to 3D and an actual amount of motion detected based on an output from the corresponding potentiometer 26, the CPU 10 determines whether the robot apparatus 1 has collided with any obstacle, and computes each of the stability margins L1 to L3, which is when no collision with any obstacle has been detected by the CPU 10 as above, and determines, based on the result of the computation, whether the robot apparatus 1 has collided with any obstacle.

Therefore, in the robot apparatus 1, the CPU 10 detects a collision with an obstacle on the basis of an actual state and posture of each of the leg blocks 3A to 3D. Thus, it is possible to detect a collision with an obstacle mush more accurately than in the detection of an obstacle through image processing or the like based on image data from the CCD camera 20 (as in FIG. 5), for example.

Also in the robot apparatus 1, an obstacle is detected on the basis of an output from each of the existing sensors (shoulder-joint pitching directional potentiometers 26 in the leg blocks 3A to 3D). Thus, the robot apparatus 1 according to the present invention can totally be constructed more simple, and can be manufactured with less costs and more effectively reduced weight, than a conventional robot apparatus having special force sensors, for example.

Because of the aforementioned construction of the robot apparatus 1, it is determined, based on a specified amount of motion given to the shoulder-joint pitching directional actuator 25 in an idling one of the leg blocks 3A to 3D and an actual amount of motion detected based on an output from the potentiometer 26 corresponding to the actuator 25, whether the robot apparatus 1 has collided with an obstacle. When any collision with an obstacle cannot have been detected by this system, the stability margins L1 to L3 are computed and it is determined, based on the results of computation, whether any obstacle has been detected. Thereby, it is possible to detect a collision with an obstacle positively without any complicated detecting mechanism, and thus it is possible to provide a robot apparatus having a simplified construction and capable of walking stably even on an irregular surface.

(5) Other Embodiments

In the foregoing, the present invention has been described concerning its application to the robot apparatus 1 constructed as shown in FIG. 4, namely, to quadruped robots. However, the present invention is not limited to this embodiment but can widely be applied to bipedal and other types of robots.

Also, the present invention has been described concerning the embodiment in which the first to third obstacle detecting methods are used in combination. However, the present invention is not applied to this embodiment but may be applied to use of one or two selected from the first to third obstacle detecting methods.

Further, the present invention has been described concerning the embodiment in which an obstacle is detected on the basis of specified and actual amounts of motion concerning the shoulder-joint pitching-directional actuator 25 in each of the leg blocks 3A to 3D. However, the present invention is not limited to this embodiment but may be applied to detecting a collision with an obstacle based on specified and actual amounts of motion concerning the shoulder-joint pitching-directional actuator 25 in each of the leg blocks 3A to 3D or on specified and actual amounts of motion concerning the knee-joint mechanism actuator 25. In short, for detecting a collision with an obstacle based on an amount of motion specified to an actuator which actuates a predetermined joint mechanism in a robot apparatus designed to walk while actuating the predetermined joint mechanism as necessary, and an actual amount of motion the actuator has done, an appropriate one may be selected as the actuator from a wide variety of actuators.

Further, the present invention has been described concerning the embodiment in which the single CPU 10 works as the controller to give the shoulder-joint pitching-directional actuator 25 an amount of motion specified to the actuator 25, the means for determining, based on the specified and actual amounts of motion, whether there exists an obstacle, and as the means for computing the distances (stability margins) L1 to L3 from the sides TRE1 to TRE3 of the triangle TR (any other polygon in case the robot apparatus 1 is a one having four or more legs) defined by connecting the points PA, PB and PD where three of the leg blocks 3A to 3D are on the ground surface to the projected point PG, on the walking surface, of the center of gravity of the robot apparatus. However, the present invention is not limited to this embodiment but these functions of the CPU 10 may be provided separately from each other.

Moreover, the present invention has been described concerning the embodiment in which the potentiometer 26 is used to detect an actual amount of motion the actuator has done. However, the present invention is not limited to this embodiment but the detecting means may be any one other than the potentiometer, which would be appropriate for the type of an actuator selected for use in the robot apparatus 1.

Furthermore, the present invention has been described concerning the embodiment in which when an obstacle cannot have been detected by the first and second obstacle detecting methods, the third obstacle detecting means is used to detect the obstacle. However, the present invention is not limited to this embodiment but the first to third obstacle detecting methods may be used in any sequence other than above to detect an obstacle or all the methods may be used simultaneously.

Industrial Applicability

As having been described in the foregoing, the robot apparatus according to the present invention includes an actuator whose motion is controlled with a control signal, a controlling means for outputting the control signal under which the actuator is caused to do a predetermined motion, and means for detecting an external force on the basis of a change shown by the control signal when the external force is applied to the actuator. It can detect an external force without having to use any dedicated sensors for the external force detection but on the basis of the control signal for controlling the operation of the robot apparatus.

Also, the robot apparatus according to the present invention further includes a joint mechanism actuated by the actuator, a motion controlling means for specifying, to the actuating means, an amount of motion for actuating the joint mechanism, and means for detecting an actual amount of motion the actuator has done for actuating the joint mechanism. By determining, based on the specified and actual amounts of motion, whether there exists an obstacle, it is possible to detect an obstacle without any complicated mechanism. Also, since the obstacle detection is made based on an amount of motion specified to the actuator and an actual amount of motion the actuator has done, it is possible to positively detect an actual physical collision with an obstacle.

The robot apparatus according to the present invention further includes a plurality of leg blocks actuated in predetermined patterns, respectively, and means for computing a distance from each side of a polygon defined by connecting landing points of landing ones of the plurality of leg blocks to a projected point, on a walking surface, of the center of gravity of the robot apparatus. By determining, based on the distances from the sides of the polygon, computed by the computing means, whether there exists an obstacle, it is possible to positively a physical collision with an obstacle without any additional dedicated part, and a collision with an obstacle by a simple mechanism.

The robot apparatus-operation controlling method according to the present invention includes steps of controlling the motion of an actuator of the robot apparatus with a control signal, and detecting an external force to the robot apparatus on the basis of a change shown by the control signal when the external force is applied to the robot apparatus. An external force can be detected without having to use any dedicated sensors for the external force detection but on the basis of the control signal for controlling the operation of the robot apparatus.

Also, the robot apparatus-operation controlling method according to the present invention further includes steps of specifying, to the actuator, an amount of motion for actuating a joint mechanism, and detecting an actual amount of motion the actuator has done for actuating the joint mechanism. By determining, based on the specified and actual amounts of motion, whether an external force has been applied to the robot apparatus, it is possible to detect an external force without any complicated mechanism, and also possible to positively an actual physical collision with an obstacle. Thus, a collision with an obstacle can positively be detected by a simple mechanism.

Also the robot apparatus-operation controlling method further includes steps of having the robot apparatus walk by actuating a plurality of leg blocks in predetermined patterns, respectively, and computing a distance from each side of a polygon defined by connecting landing points of landing ones of the plurality of leg blocks to a projected point, on a walking surface, of the center of gravity of the robot apparatus. By determining, based on the distances from the sides of the polygon, computed by the computing means, whether there exists an obstacle, it is possible to positively detect a physical collision with an obstacle can positively be detected without any additional dedicated part, and a collision with an obstacle by a simple mechanism.

The external force sensor according to the present invention includes means for actuating each portion of a robot apparatus, a controlling means for specifying, to the actuating means, an amount of motion for actuating the robot apparatus portion, means for detecting an actual amount of motion the actuating means has done, and means for determining, on the basis of the specified and actual amounts of motion, whether or not an external force has been applied to the robot apparatus. Thus, it is possible to detect an obstacle without any complicated mechanism, and also possible to positively detect an actual physical collision with an obstacle, and a collision with an obstacle by a simple mechanism.

The program according to the present invention causes a robot apparatus to control the motion of an actuator thereof with a control signal, and detect an external force to the robot apparatus on the basis of a change shown by the control signal when the external force is applied to the robot apparatus. It can detect an external force without having to use any dedicated sensors for the external force detection but on the basis of the control signal for controlling the operation of the robot apparatus.

The recording medium according to the present invention has recorded therein a program which causes a robot apparatus to control the motion of an actuator thereof with a control signal, and detect an external force to the robot apparatus on the basis of a change shown by the control signal when the external force is applied to the robot apparatus. The robot apparatus caused to operate as above under the program recorded in the recording medium can detect an external force without having to use any dedicated sensors for the external force detection but on the basis of the control signal for controlling its own operation.

The external force detecting method according to the present invention includes steps of supplying means for actuating each portion of a robot apparatus with an amount of motion specified to actuating the robot-apparatus portion, detecting an actual amount of motion the actuating means has done for actuating the portion, and determining whether or not an external force has been applied to the robot apparatus, on the basis of the specified and actual amounts of motion. By determining, based on the specified and actual amounts of motion, whether there exists an obstacle, it is possible to detect an obstacle without any complicated mechanism. Also, it is possible to positively detect an actual physical collision with an obstacle, and a collision with an obstacle by a simple mechanism.

What is claimed is:

1. An autonomously behaving robot apparatus comprising:
   a body;
   a plurality of actuators connected to the body and each having a joint drive;
   means for controlling the actuator based on a predetermined control signal;
   a storage means having stored a relation between the control signal and a measured value of a torque on the joint drive;
   a storage means having stored a relation between a force applied to the actuator and a computed value of a torque on each joint drive based on the force application; and
   an external force detecting means for computing the measured torque value on the basis of a change of the control signal and detecting a direction and magnitude of the force applied to the actuator from the relation between the computed measured torque value and computed torque value.

2. The apparatus as set forth in claim 1, wherein the control signal is a PWM (pulse width modulation) pulse.

3. The apparatus as set forth in claim 1, further comprising:

a plurality of leg blocks to be driven in a predetermined pattern; and means for computing a distance from each side of a polygon defined by connecting landing points of landing ones of the plurality of leg blocks to a projected point, on a walking surface, of the center of gravity of the robot apparatus;

the external force detecting means determining whether or not an external force is applied to the robot apparatus, on the basis of the specified and actual amounts of motion, and the distance computing means-computed distance from each side of the polygon to the projected point.

4. A method of controlling the operation of an autonomously behaving robot apparatus, comprising steps of:

controlling a plurality of actuators connected to the body unit and each having a joint drive with the use of a predetermined control signal; and computing, on the basis of a change of the control signal, the measured torque value with the use of a storage means having stored therein a relation between the control signal and a measured value of a torque developed at the joint drive and a storage means having stored therein a relation between a force applied to the actuator and a computed value of a torque developed at each joint drive due to the force application and detecting a direction and magnitude of the force applied to the actuator from the relation between the computed measured torque value and computed torque value.

5. The method as set forth in claim 4, wherein the control signal is a PWM (pulse width modulation) pulse.

6. The method as set forth in claim 4, wherein the robot apparatus has a plurality of leg blocks to be driven in a predetermined pattern, and further comprising steps of:

computing a distance from each side of a polygon defined by connecting landing points of landing ones of the plurality of leg blocks to a projected point, on a walking surface, of the center of gravity of the robot apparatus; and determining whether or not an external force is applied to the robot apparatus, on the basis of the specified and actual amounts of motion, and the distance computing means-computed distance from each side of the polygon to the projected point.

* * * * *

UNITED STATES PATENT AND TRADEMARK OFFICE
CERTIFICATE OF CORRECTION

PATENT NO. : 6,865,446 B2
DATED : March 8, 2005
INVENTOR(S) : Yokono et al.

It is certified that error appears in the above-identified patent and that said Letters Patent is hereby corrected as shown below:

<u>Title page</u>,
Item [30], Foreign Application Priority Data, please add
-- Feb. 28, 2001  (JP) ............. 2001-55669 --

Signed and Sealed this

Thirty-first Day of May, 2005

JON W. DUDAS
*Director of the United States Patent and Trademark Office*